US012694239B2

(12) United States Patent
Volkerink et al.

(10) Patent No.: US 12,694,239 B2
(45) Date of Patent: Jul. 28, 2026

(54) HYBRID RFID AND WIRELESS COMMUNICATION SYSTEM FOR TRACKING OF ASSETS AND PEOPLE AND METHOD THEREOF

(71) Applicant: Trackonomy Systems, Inc., San Jose, CA (US)

(72) Inventors: Hendrik J Volkerink, Palo Alto, CA (US); Ajay Khoche, West San Jose, CA (US); Saurabh Sanghai, Cupertino, CA (US)

( * ) Notice: Subject to any disclaimer, the term of this patent is extended or adjusted under 35 U.S.C. 154(b) by 0 days.

(21) Appl. No.: 17/873,072

(22) Filed: Jul. 25, 2022

(65) Prior Publication Data

US 2023/0028603 A1 Jan. 26, 2023

Related U.S. Application Data

(60) Provisional application No. 63/225,550, filed on Jul. 25, 2021.

(51) Int. Cl.
*G06K 7/10* (2006.01)
*G06K 19/07* (2006.01)
(Continued)

(52) U.S. Cl.
CPC ..... *G06K 7/10316* (2013.01); *G06K 7/10366* (2013.01); *G06K 19/0723* (2013.01); *H04W 4/80* (2018.02)

(58) Field of Classification Search
CPC .................................................. G06K 7/10316
See application file for complete search history.

(56) References Cited

U.S. PATENT DOCUMENTS 5,495,250 A 2/1996 Ghaem et al.
6,375,780 B1 4/2002 Tuttle et al.
(Continued)

FOREIGN PATENT DOCUMENTS

AU 2018204317 A1 1/2019
CA 3008512 A1 12/2018
(Continued)

OTHER PUBLICATIONS

International Patent Application No. PCT/US2023/016408 International Search Report and Written Opinion dated Aug. 21, 2023, 32 pages.

(Continued)

*Primary Examiner* — Davetta W Goins
*Assistant Examiner* — Pameshanand Mahase

(57) ABSTRACT

An improved radio frequency identification (RFID) reader system includes a plurality of wireless integrated RFID readers located in different locations in an environment, one or more RFID tags, each RFID tag configured to generate a radio frequency (RF) response signal based on data stored on the RFID tag, and a wireless communication gateway. Each of the wireless integrated RFID readers includes an RFID antenna, an electronics module coupled to the RFID antenna configured to operate the RFID antenna and interpret data signals received at the RFID antenna from one or more RFID tags, and a wireless communication system of a first type configured to wirelessly communicate with wireless nodes of the RFID reader system. The wireless communication gateway includes a wireless communication system of the first type configured to wirelessly communicate with the plurality of wireless integrated RFID readers.

10 Claims, 23 Drawing Sheets

(51) Int. Cl.
　　*H04B 5/77*　　　　(2024.01)
　　*H04W 4/80*　　　　(2018.01)

(56)　　　　References Cited

U.S. PATENT DOCUMENTS

| | | |
|---|---|---|
| 6,614,392 B2 | 9/2003 | Howard |
| 6,816,075 B2 | 11/2004 | Grunes et al. |
| 7,030,760 B1 | 4/2006 | Brown |
| 7,048,194 B2 | 5/2006 | Minami et al. |
| 7,177,054 B2 | 2/2007 | Silverbrook et al. |
| 7,299,990 B2 | 11/2007 | Hoshina |
| 7,360,714 B2 | 4/2008 | Sano et al. |
| 7,405,656 B2 | 7/2008 | Olsen |
| 7,511,616 B2 | 3/2009 | Lake |
| 7,540,603 B2 | 6/2009 | Otsuki |
| 7,743,984 B2 | 6/2010 | Olsen et al. |
| 7,838,844 B2 | 11/2010 | Wagner et al. |
| 7,866,555 B2 | 1/2011 | Schmid et al. |
| 8,016,194 B2 | 9/2011 | Hause et al. |
| 8,072,620 B2 | 12/2011 | Yamamoto et al. |
| 8,171,791 B2 | 5/2012 | Sy et al. |
| 8,231,749 B2 | 7/2012 | Dent et al. |
| 8,292,173 B2 | 10/2012 | Yturralde et al. |
| 8,317,230 B2 | 11/2012 | Asay |
| 8,581,701 B2 | 11/2013 | Steinmetz et al. |
| 8,686,685 B2 | 4/2014 | Moshfeghi |
| 8,833,664 B2 | 9/2014 | Choi |
| 9,251,459 B2 | 2/2016 | Simske et al. |
| 9,305,283 B1 | 4/2016 | Lauka et al. |
| 9,643,460 B2 | 5/2017 | Peine et al. |
| 9,644,401 B2 | 5/2017 | Nguyen et al. |
| 10,095,898 B2 | 10/2018 | Iqbal et al. |
| 10,217,075 B1 | 2/2019 | Ward et al. |
| 10,319,203 B1 | 6/2019 | Testanero et al. |
| 10,819,137 B2 | 10/2020 | Khoche et al. |
| 11,115,732 B2 | 9/2021 | Lucrecio et al. |
| 11,295,190 B2 | 4/2022 | Volkerink et al. |
| 2004/0044493 A1 | 3/2004 | Coulthard |
| 2004/0247016 A1 | 12/2004 | Faries et al. |
| 2005/0099292 A1 | 5/2005 | Sajkowsky |
| 2005/0205673 A1 | 9/2005 | Morris et al. |
| 2006/0065730 A1 | 3/2006 | Quan et al. |
| 2006/0213964 A1 | 9/2006 | Excoffier et al. |
| 2007/0008120 A1 | 1/2007 | Smith et al. |
| 2007/0049291 A1 | 3/2007 | Kim et al. |
| 2007/0164862 A1 | 7/2007 | Dhanjal et al. |
| 2007/0182556 A1 | 8/2007 | Rado |
| 2007/0207792 A1 | 9/2007 | Loving |
| 2007/0287473 A1 | 12/2007 | Dupray |
| 2008/0198002 A1 | 8/2008 | Bartholf et al. |
| 2008/0198022 A1 | 8/2008 | Battles et al. |
| 2009/0174600 A1 | 7/2009 | Mazlum et al. |
| 2009/0192709 A1 | 7/2009 | Yonker et al. |
| 2010/0089803 A1 | 4/2010 | Lavi et al. |
| 2010/0201520 A1 | 8/2010 | Stern et al. |
| 2011/0062237 A1 | 3/2011 | Chaves |
| 2011/0139871 A1 | 6/2011 | Yturralde et al. |
| 2011/0173235 A1 | 7/2011 | Aman et al. |
| 2011/0309931 A1 | 12/2011 | Rose |
| 2012/0256728 A1 | 10/2012 | Bajic et al. |
| 2012/0278676 A1 | 11/2012 | Teraura |
| 2012/0286939 A1* | 11/2012 | Cote ............... G06K 19/07707 |
| | | 340/10.6 |
| 2012/0326862 A1* | 12/2012 | Kwak .................. A01K 29/005 |
| | | 340/539.12 |
| 2013/0229263 A1* | 9/2013 | Graczyk ................ G08C 23/04 |
| | | 340/10.1 |
| 2013/0250357 A1 | 9/2013 | Yu |
| 2013/0282392 A1 | 10/2013 | Wurm |
| 2014/0067313 A1 | 3/2014 | Breed |
| 2014/0159869 A1 | 6/2014 | Zumsteg et al. |
| 2014/0240088 A1 | 8/2014 | Robinette et al. |
| 2014/0263634 A1 | 9/2014 | Iqbal et al. |
| 2015/0097674 A1 | 4/2015 | Mondal et al. |
| 2015/0156253 A1 | 6/2015 | Skaaksrud et al. |
| 2015/0349667 A1 | 12/2015 | Andosca et al. |
| 2015/0349917 A1 | 12/2015 | Skaaksrud |
| 2015/0379860 A1* | 12/2015 | Vardi ................. G08B 21/0275 |
| | | 340/8.1 |
| 2016/0011074 A1 | 1/2016 | Mian et al. |
| 2016/0026213 A1 | 1/2016 | Li et al. |
| 2016/0117458 A1* | 4/2016 | Hermans ............... G16H 10/65 |
| | | 705/2 |
| 2016/0205509 A1 | 7/2016 | Hopcraft et al. |
| 2016/0239795 A1 | 8/2016 | Burch et al. |
| 2017/0011606 A1 | 1/2017 | Ceccon et al. |
| 2017/0019754 A1 | 1/2017 | Wilkinson |
| 2017/0083857 A1 | 3/2017 | Barton et al. |
| 2017/0199268 A1 | 7/2017 | Frederick |
| 2017/0276507 A1 | 9/2017 | Zacharenko |
| 2017/0286903 A1 | 10/2017 | Elizondo |
| 2017/0337405 A1 | 11/2017 | Schutz |
| 2018/0011074 A1 | 1/2018 | Roman et al. |
| 2018/0163095 A1 | 6/2018 | Khoche |
| 2019/0087702 A1 | 3/2019 | Cotoc |
| 2019/0205831 A1 | 7/2019 | Kanaoka et al. |
| 2019/0303848 A1 | 10/2019 | Schoening |
| 2019/0337342 A1 | 11/2019 | Genheimer et al. |
| 2019/0362215 A1 | 11/2019 | Khoche |
| 2019/0370624 A1 | 12/2019 | Khoche |
| 2019/0373431 A1 | 12/2019 | Gabriele et al. |
| 2020/0234098 A1 | 7/2020 | Volkerink |
| 2020/0275369 A1 | 8/2020 | Foster et al. |
| 2021/0012173 A1 | 1/2021 | Batra |
| 2021/0027122 A1 | 1/2021 | Volkerink |
| 2021/0065529 A1* | 3/2021 | Bergman .............. H04W 4/021 |
| 2021/0143902 A1 | 5/2021 | Connolly et al. |
| 2021/0150159 A1 | 5/2021 | Volkerink |
| 2021/0179352 A1 | 6/2021 | Haid |
| 2021/0224721 A1 | 7/2021 | Morgenthau |
| 2022/0277154 A1* | 9/2022 | Joao ........................ H04W 4/12 |
| 2022/0319301 A1 | 10/2022 | Krejcarek |
| 2023/0055289 A1 | 2/2023 | Bianculli et al. |

FOREIGN PATENT DOCUMENTS

| | | |
|---|---|---|
| JP | 2008239282 A | 10/2008 |
| JP | 2011090670 A | 5/2011 |
| JP | 2012141995 A | 7/2012 |
| WO | WO 2011/038018 A1 | 3/2011 |
| WO | 2014145130 A1 | 9/2014 |
| WO | WO 2021/076513 A1 | 4/2021 |

OTHER PUBLICATIONS

International Patent Application No. PCT/US2022/038238 International Search Report and Written Opinion dated Feb. 2, 2023, 17 pages.

International Patent Application No. PCT/2020/061394, International Search Report and Written Opinion dated Feb. 26, 2021, 16 pages.

International Patent Application No. PCT/US20/26475, International Search Report and Written Opinion, dated Jul. 23, 2020, 14 pages.

Roundy et al., Energy Harvester for Rotating Environments Using Offset Pendulum and Nonlinear Dynamics, Smart Materials and Structures, IOP Publishing LTD, Sep. 9, 2014.

Ku et al., Joint Power Waveforming and Beamforming for Wireless Power Transfer, IEEE Transactions on Signal Processing, vol. 65, No. 24, Dec. 15, 2017, pp. 6409-6422.

U.S. Appl. No. 17/067,608, Ex Parte Quayle Action dated Sep. 24, 2021, 7 pages.

Ruzzeli et al., "On the RFID wake-up impulse for multi-hop sensor networks." The 1st ACM Workshop on Convergence of RFID and Wireless Sensor Networks and their Applications (SenseID) at the 5th ACM International Conference on Embedded Networked Sensor Systems (ACM SenSys 2007), Syndey, Australia, Nov. 4-9, 2007.

Ding, et al., "RFID-based Production Data Analysis in an IoT-enabled Smart Job-shop." IEEE/CAA Journal of Automatics Sinica, vol. 5, No. 1, 1, Jan. 2018.

(56) References Cited

OTHER PUBLICATIONS

U.S. Appl. No. 16/839,048, Ex Parte Quayle Action dated Jul. 22, 2021, 6 pages.

U.S. Appl. No. 16/839,048, Notice of Allowance dated Oct. 8, 2021, 14 pages.

Zhai et al. ("A practical wireless charging system based on ultra-wideband retro-reflective beamforming," 2010 IEEE Antennas and Propagation Society International Symposium, 2010, pp. 1-4, doi: 10.1109/APS.2010.5561113) (Year: 2010.

Non Final Office Action for U.S. Appl. No. 18/126,707, mailed Jul. 30, 2025, 32 pages.

Notice of Allowance for U.S. Appl. No. 17/931,518, mailed Mar. 19, 2025, 9 pages.

Canadian Examination Report mailed Mar. 6, 2024, for CA 3,158,677, 6 pages.

International Patent Application No. PCT/US2022/043255 International Search Report and Written Opinion dated Jan. 31, 2023, 11 pages.

Non Final Office Action for U.S. Appl. No. 16/359,808, mailed Jan. 22, 2020, 7 pages.

Non Final Ofice Action for U.S. Appl. No. 17/027,096, mailed Jun. 24, 2021, 6 pages.

Non Final Office Action for U.S. Appl. No. 17/683,738, mailed Feb. 16, 2023, 12 pages.

Non Final Office Action for U.S. Appl. No. 18/083,550, mailed Jan. 9, 2024, 9 pages.

Non Final Office Action for U.S. Appl. No. 18/083,550, mailed May 23, 2023, 7 pages.

Non-Final Office Action Issued in U.S. Appl. No. 17/679,992, mailed Feb. 15, 2024, 7 pages.

Non-Final Office Action Issued in U.S. Appl. No. 17/679,992, mailed Jan. 25, 2023, 8 pages.

U.S. Appl. No. 16/839,048, Notice of Allowance dated Nov. 29, 2021, 15 pages.

U.S. Appl. No. 17/067,608, Notice of Allowance dated Dec. 1, 2021, 9 pages.

Extended European Search Report for European Patent Application No. 22850156.5, mailed Apr. 11, 2025. 14 Pages.

* cited by examiner

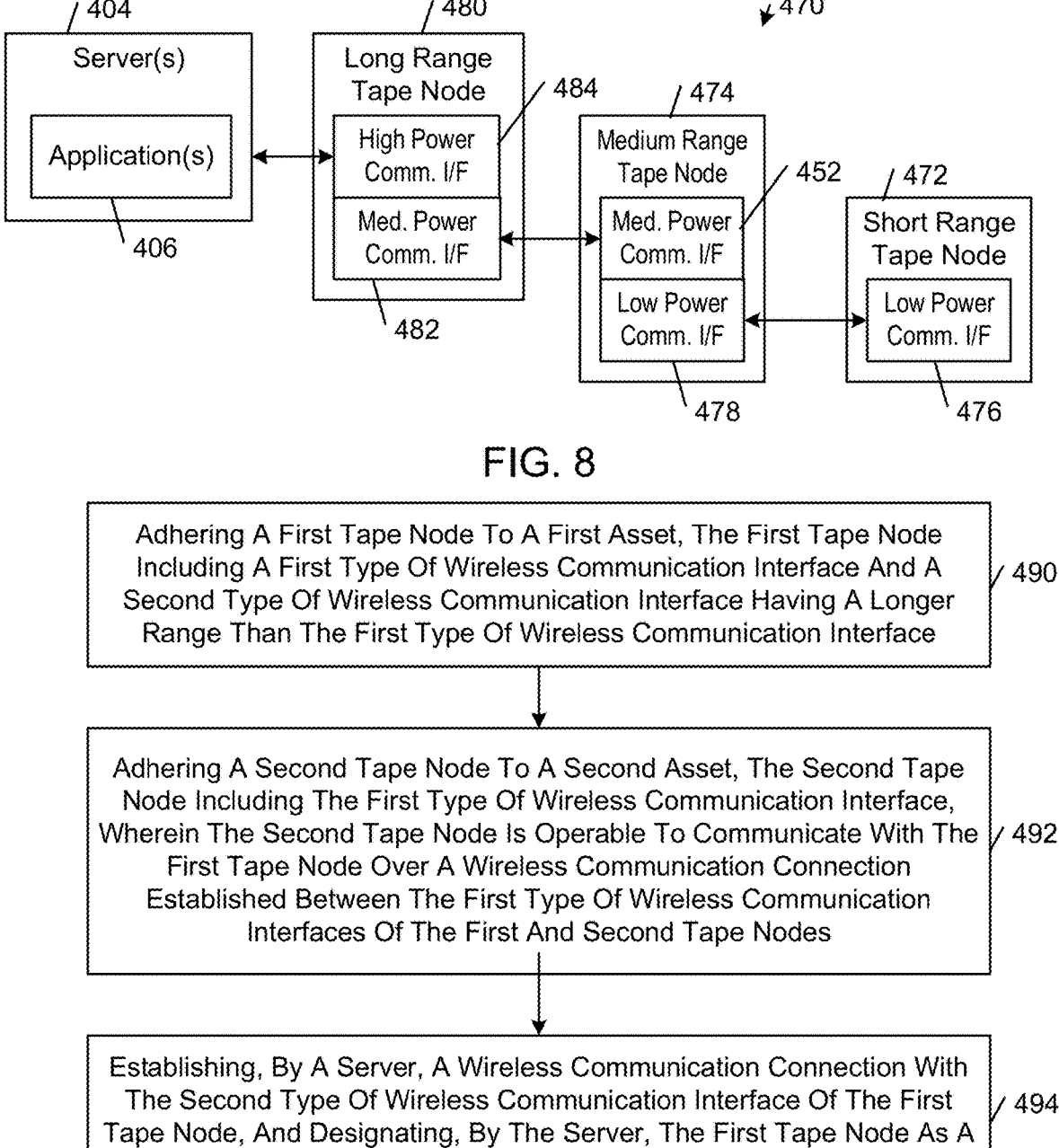

FIG. 8

Adhering A First Tape Node To A First Asset, The First Tape Node Including A First Type Of Wireless Communication Interface And A Second Type Of Wireless Communication Interface Having A Longer Range Than The First Type Of Wireless Communication Interface — 490

Adhering A Second Tape Node To A Second Asset, The Second Tape Node Including The First Type Of Wireless Communication Interface, Wherein The Second Tape Node Is Operable To Communicate With The First Tape Node Over A Wireless Communication Connection Established Between The First Type Of Wireless Communication Interfaces Of The First And Second Tape Nodes — 492

Establishing, By A Server, A Wireless Communication Connection With The Second Type Of Wireless Communication Interface Of The First Tape Node, And Designating, By The Server, The First Tape Node As A Master Node Of The Second Tape Node — 494

FIG. 9

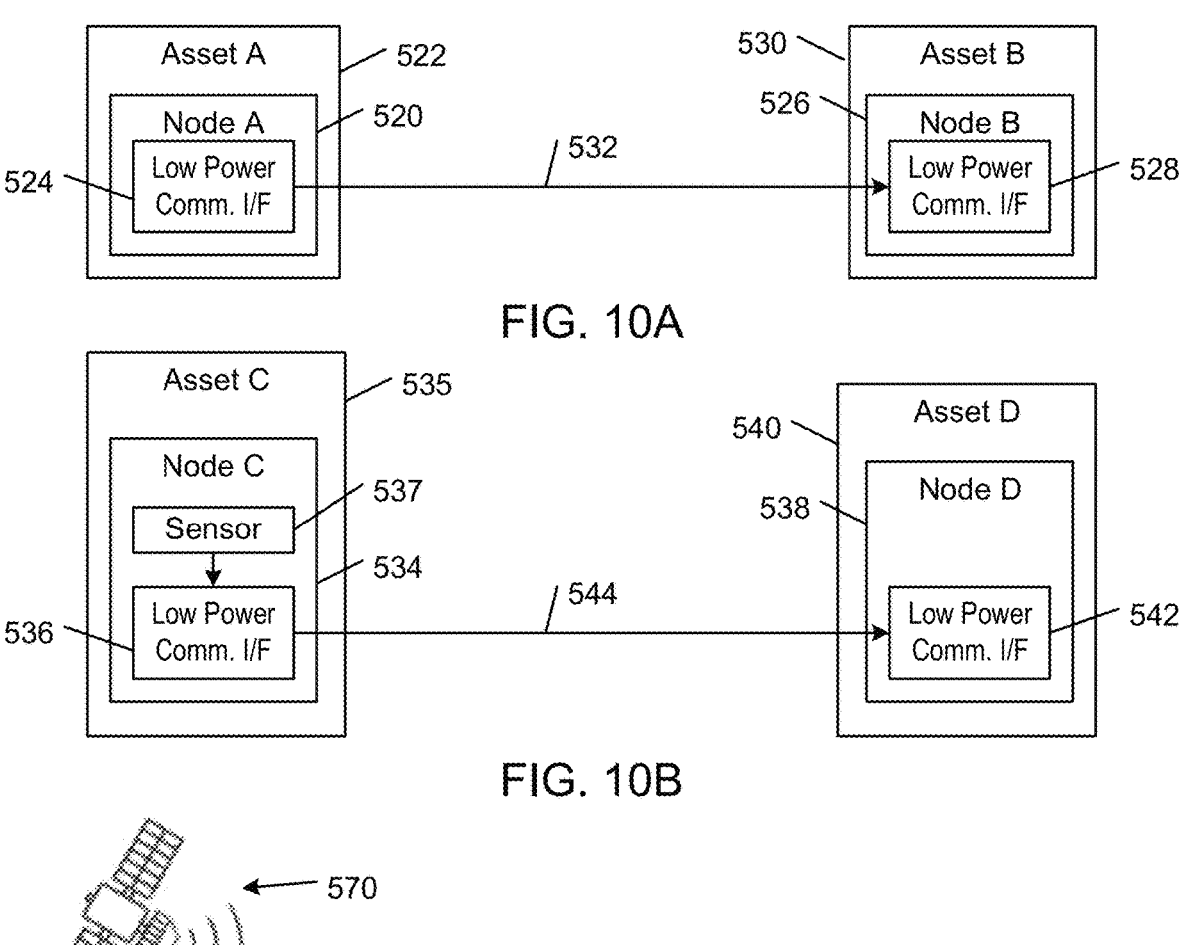
FIG. 10A
FIG. 10B
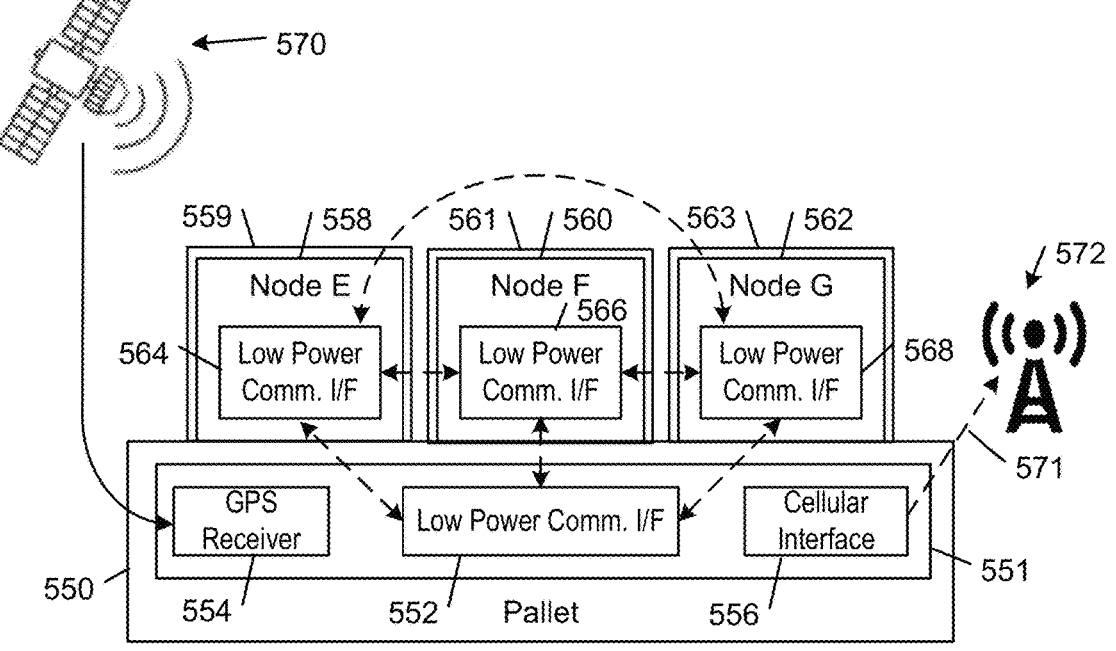
FIG. 10C

1201

1501

Passive RFID Tag
1520

RFID Response Signal
1522

Wireless RFID Sniffing
Device
1530A

Wireless RFID Sniffing
Device
1530B

Wireless RFID Sniffing
Device
1530C

RFID Interrogation Signal
1514

RFID Power
Delivery Module
1510

RFID
Transmitter
1512

External
Power

1540

Environment
1601

1510

1530B

1530A

RFID Interrogation Signal
1514

RFID Response
Signal
1522

Asset
1610

Passive RFID Tag
1520

1801

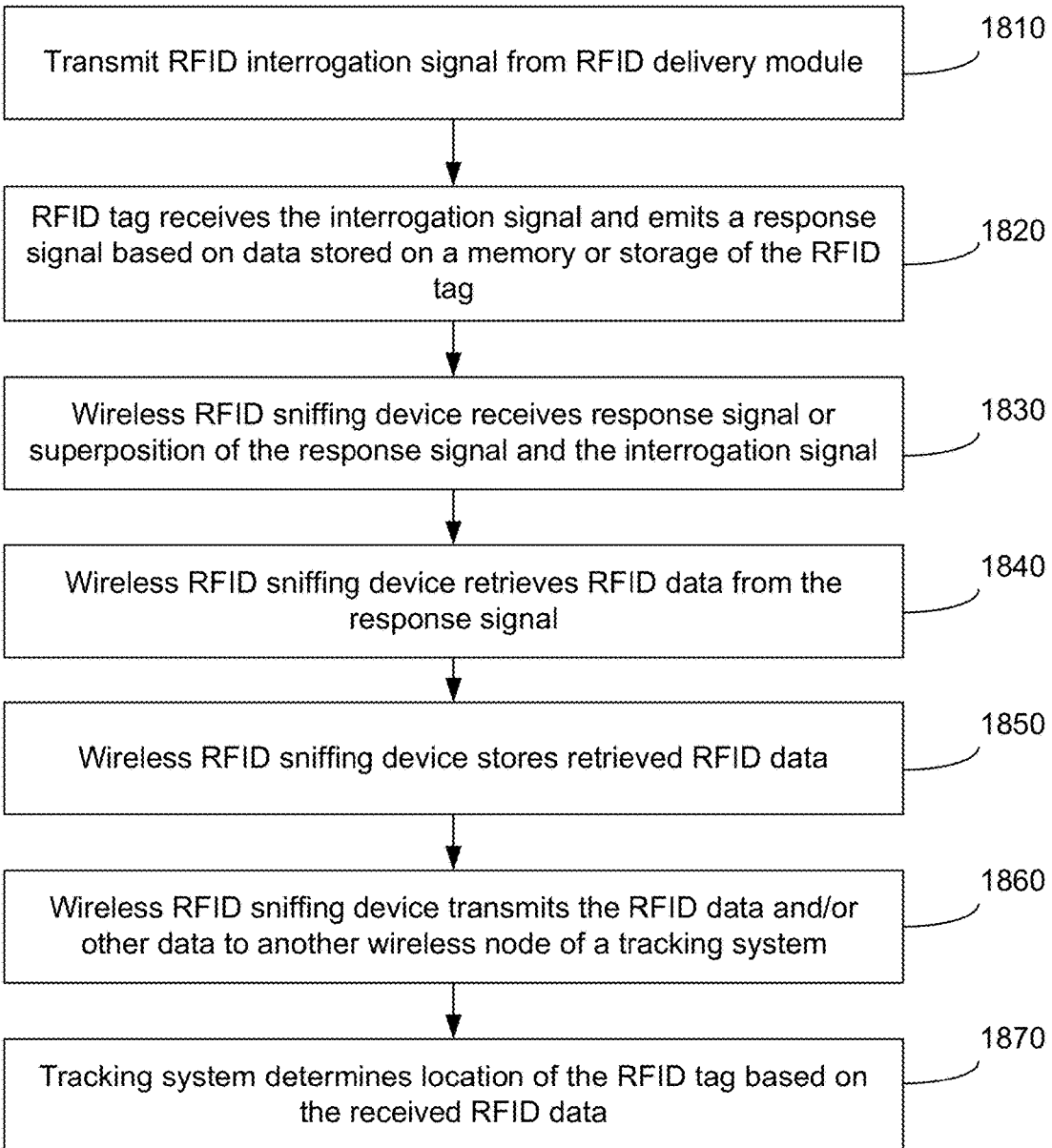

Transmit RFID interrogation signal from RFID delivery module — 1810

RFID tag receives the interrogation signal and emits a response signal based on data stored on a memory or storage of the RFID tag — 1820

Wireless RFID sniffing device receives response signal or superposition of the response signal and the interrogation signal — 1830

Wireless RFID sniffing device retrieves RFID data from the response signal — 1840

Wireless RFID sniffing device stores retrieved RFID data — 1850

Wireless RFID sniffing device transmits the RFID data and/or other data to another wireless node of a tracking system — 1860

Tracking system determines location of the RFID tag based on the received RFID data — 1870

HYBRID RFID AND WIRELESS COMMUNICATION SYSTEM FOR TRACKING OF ASSETS AND PEOPLE AND METHOD THEREOF

CROSS-REFERENCE TO RELATED APPLICATIONS

This application claims priority to pending U.S. Provisional Patent Application No. 63/225,550, filed on Jul. 25, 2021.

FIELD OF THE DISCLOSURE

This disclosure generally relates to wireless internet of things (TOT) devices.

BACKGROUND

Traditional RFID systems and infrastructure typically require the installation of multiple RFID reader components in a location to enable communications between RFID tags and an RFID reader system at the location. The installation may be restricted by existing resources an infrastructure in a location, such as available electrical power, internet connectivity, and physical space or require expensive and complicated changes to the location's infrastructure, such as adding electrical lines and cables for power and data transfer. After installation, changes to the environment, such as new furniture or equipment, may result in decreased performance of an RFID system. With a traditional RFID system, tuning or re-optimizing the RFID reader system may be difficult or expensive. A more versatile RFID system is desirable for improved cost efficiency, deployment, and performance.

SUMMARY

An improved radio frequency identification (RFID) reader system includes a plurality of wireless integrated RFID readers located in different locations in an environment, one or more RFID tags, each RFID tag configured to generate a radio frequency (RF) response signal based on data stored on the RFID tag, and a wireless communication gateway. The one or more RFID tags may include passive RFID tags and active RFID tags. Each of the wireless integrated RFID readers includes an RFID antenna, an electronics module coupled to the RFID antenna configured to operate the RFID antenna and interpret data signals received at the RFID antenna from one or more RFID tags, and a wireless communication system of a first type configured to wirelessly communicate with wireless nodes of the RFID reader system. The wireless communication gateway includes a wireless communication system of the first type configured to wirelessly communicate with the plurality of wireless integrated RFID readers.

The wireless communications gateway may also communicate with a control system for collecting, storing, and analyzing RFID data received from RFID tags by the plurality of wireless integrated RFID readers and communications associated with the plurality of wireless integrated RFID readers. The control system may be associated with an asset tracking system that tracks assets that are associated with at least one or more of the RFID tags. The improved RFID reader system requires fewer requirements for wiring and infrastructure in the environment where the wireless integrated RFID readers are located. This allows for flexibility in installing and configuring the improved RFID readers ystem.

A hybrid radio frequency identification (RFID) reader system includes an RFID power delivery module configured to emit an RFID interrogation signal into an environment, one or more wireless RFID sniffing devices located in the environment, and one or more RFID tags configured to receive the RFID interrogation signal and generate an RFID response signal based at least on data stored on the one or more RFID tags, in response.

Each of the one or more wireless RFID sniffing devices includes an RFID antenna configured to receive RFID response signals from one or more RFID tags and the interrogation signal from the RFID power delivery module, an RFID electronics module coupled to the RFID antenna configured to operate the RFID antenna and interpret signals and data received at the RFID antenna from the one or more RFID tags, and a wireless communication system of a first type configured to communicate with wireless nodes of the RFID reader system. The RFID sniffing device is configured, in some embodiments, to communicate with a wireless gateway using the wireless communication system of the first type. The wireless gateway may also communicate with a control system for collecting, storing, and analyzing RFID data received from RFID tags by the plurality of wireless integrated RFID readers and communications associated with the plurality of wireless integrated RFID readers.

In some embodiments, the RFID sniffing devices are battery powered devices. By offloading the responsibility of emitting the RFID interrogation on signal to the RFID power delivery module, the RFID sniffing devices may extend their battery life. The hybrid RFID reader system allows for versatility in selection of RFID devices and installation configurations for RFID readers systems in a wide range of environments.

An adhesive tape platform includes a flexible substrate, a flexible cover layer on the substrate, a battery between the flexible substrate and the flexible cover layer, a device layer between the flexible substrate and the flexible cover layer comprising components, and a circuit between the flexible substrate and the flexible cover layer electrically connecting components of the device layer and the battery. The components of the device layer include a wireless communication system of a first type, an RFID reader, a memory, and a processor. The adhesive tape platform may be a flexible device, according to some embodiments. The adhesive tape platform may include an adhesive layer on the substrate, such that the adhesive tape platform may be adhered to the surface of an object, a wall, or a location.

The adhesive tape platform is configured to operate as an RFID reader or a wireless RFID sniffing device, according to some embodiments. The adhesive tape platform may use the RFID reader to retrieve data from RFID tags and communicate the retrieved data to other wireless nodes of a tracking system using the wireless communication system of the first type. The adhesive tape platform may also store RFID data retrieved from RFID tags and other data on its memory, and offload the data using wireless communications to a wireless node of the tracking system at a later time, according to some embodiments.

BRIEF DESCRIPTION OF THE DRAWINGS

FIG. 8 is a diagrammatic view of a hierarchical communications network, according to some embodiments.

FIG. 9 is a flow diagram of a method of creating a hierarchical communications network, according to some embodiments.

FIGS. 10A-10E are diagrammatic views of exemplary use cases for a distributed agent operating system, according to some embodiments.

FIG. 18 is flowchart for a method of communicating with RFID tags using a hybrid RFID reader system to determine the location of the RFID tags, according to some embodiments.

DETAILED DESCRIPTION

Figure 1A:
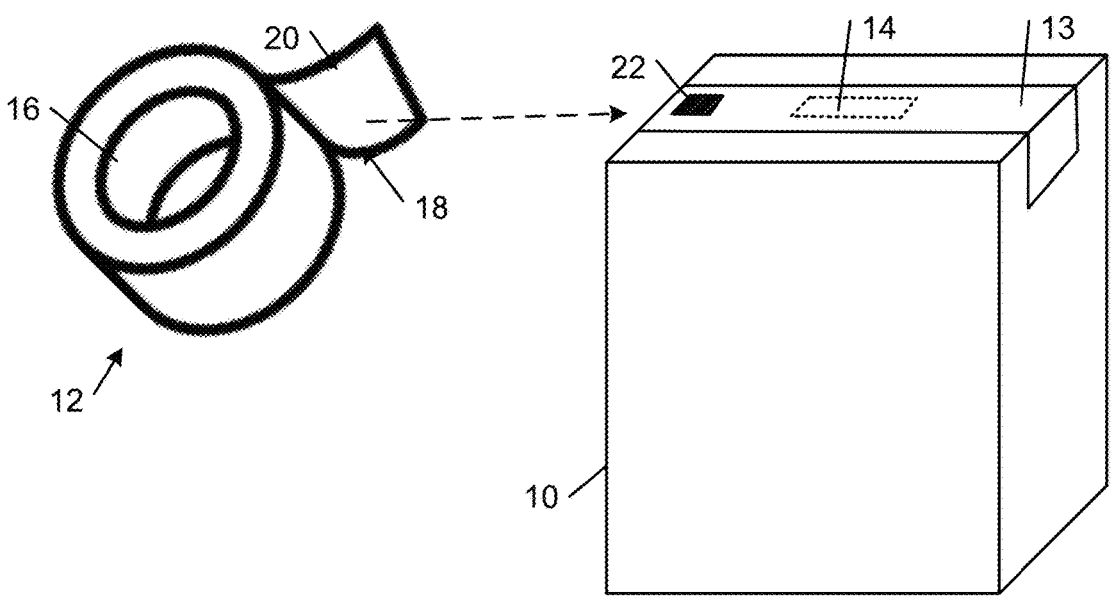
FIG. 1A is a diagrammatic view of an asset that has been sealed for shipment using a segment of an example adhesive tape platform dispensed from a roll, according to some embodiments.

An improved RFID reader system is disclosed which is configured to communicate with active and passive RFID tags. The improved RFID reader system includes multiple integrated RFID reader modules at different locations in an environment. In embodiments, not every integrated RFID reader module requires a direct wired connection to an electronics module, gateway module, and/or control system. A traditional electronics module, gateway module, and/or control system may collectively be referred to herein as an "RFID controller." The integrated RFID reader module is a device that includes at least an RFID reader antenna and an electronics module coupled to the RFID reader antenna. The electronics module includes electronics components for operating the RFID reader antenna and communicating with RFID tags.

In some embodiments, the integrated RFID reader modules are wired devices that are connected in series, i.e., in a daisy chain, with one of the daisy chained integrated RFID connected to an RFID controller or a gateway module configured to receive RFID data from the daisy chained integrated RFID readers. Some or all of the integrated RFID reader modules include one or more passthroughs for supplying power to an integrated RFID reader module connected in series or for communicating data between the RFID reader modules connected in series.

In some embodiments, one or more of the integrated RFID reader modules are wireless devices that include one or more wireless communication systems (e.g., Bluetooth, BLE, LoRa, cellular communications, satellite communications, WiFi, Zigbee, etc.), in addition to the RFID communication system that includes an RFID antenna and the electronics module. The wireless integrated RFID reader modules communicate with a wireless RFID controller that includes a wireless communication gateway that includes a same type of wireless communication system as the wireless integrated reader module.

The wireless integrated RIFD reader is configured to communicate RFID data to the wireless RFID controller without requiring a wired connection to an RFID controller.

The improved RFID reader system greatly simplifies installation and deployment of the RFID reader modules, in comparison to a traditional RFID system. The wired and wireless integrated RFID reader modules allow for more versatility in deploying the RFID reader system with less strict requirements in terms of wired infrastructure and physical space in the environment of the RFID reader system.

A hybrid RFID reader system is disclosed which is configured to communicate with active and passive RFID tags using wireless IOT devices, also referred to herein as wireless RFID sniffing devices, integrated with an RFID reader system including a wireless RFID antenna. The RFID sniffing devices are configured to receive RFID signals and detect signals coming from RFID tags, but may not necessarily transmit RFID query signals to RFID tags. In other embodiments, the RFID sniffing device may be configured to both transmit and receive signals to and from RFID tags. The RFID sniffing device may be a battery powered or a line powered device, according to some embodiments. In some embodiments, the hybrid RFID system includes an RFID power delivery module for transmitting RFID query signals to RFID tags in an environment, one or more wireless RFID sniffing devices configured to receive RFID signals from RFID tags in response to receiving the query signal, and a wireless gateway device to receive the RFID data collected by the RFID sniffing devices via a wireless communication connection. The RFID power delivery module may be connected to an external power source, such as from an electrical line or outlet or may have a battery that is larger than the battery of the wireless RFID sniffing devices, in some embodiments. The RFID sniffing devices may receive RFID data from RFID tags in the environment that have been illuminated by the RFID power delivery module and transmit the RFID data to the gateway over a wireless communication connection, so that the gateway may transfer the data to a server, a nearby client device, the cloud, or to another wireless node of a wireless tracking system.

The hybrid RFID reader system allows for low-cost and easy installation, deployment, and operation of RFID reader systems in different types of environments, especially in environments where the installation of a traditional RFID reader system may be difficult. The hybrid RFID reader system is also easily reconfigured due to a lower reliance on wired infrastructure such as electrical outlets and wiring.

In some embodiments, a wireless RFID sniffing device, a wireless integrated reader module and/or a gateway module is a wireless IOT device. In further embodiments, the wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or "peripheral" wireless node, also referred to as an outer node, leaf node, or terminal node, refers to a node that does not have any child nodes.

In some instances, a "wireless node" may refer to a node or wireless device of the wireless tracking system that is not an adhesive tape platform. For example, a wireless node, in some embodiments, may have a form factor that is not flexible or may not include an adhesive.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

Introduction

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
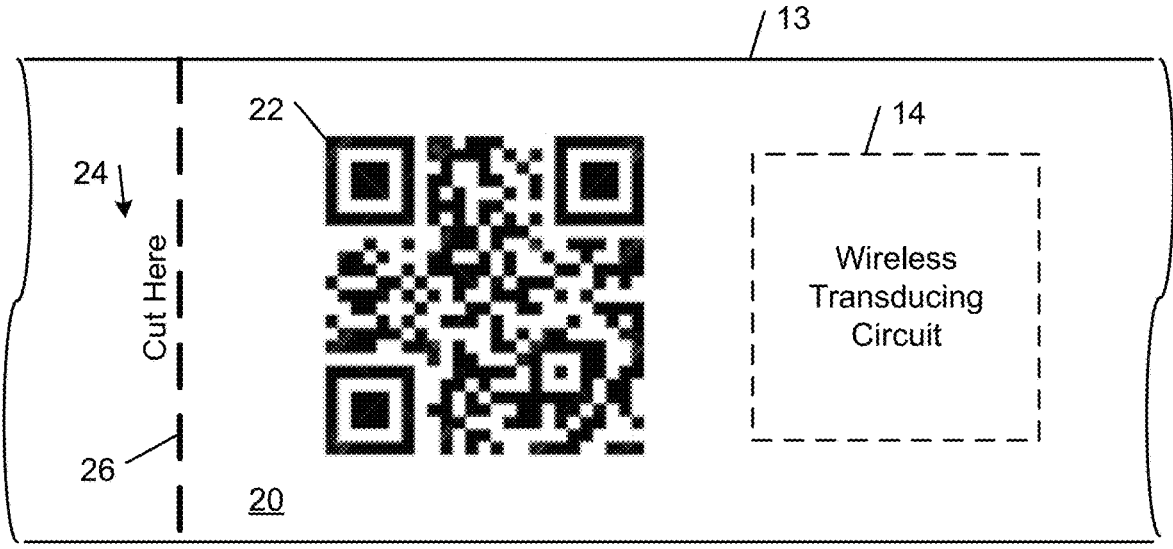
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figures 2, 3, 4:
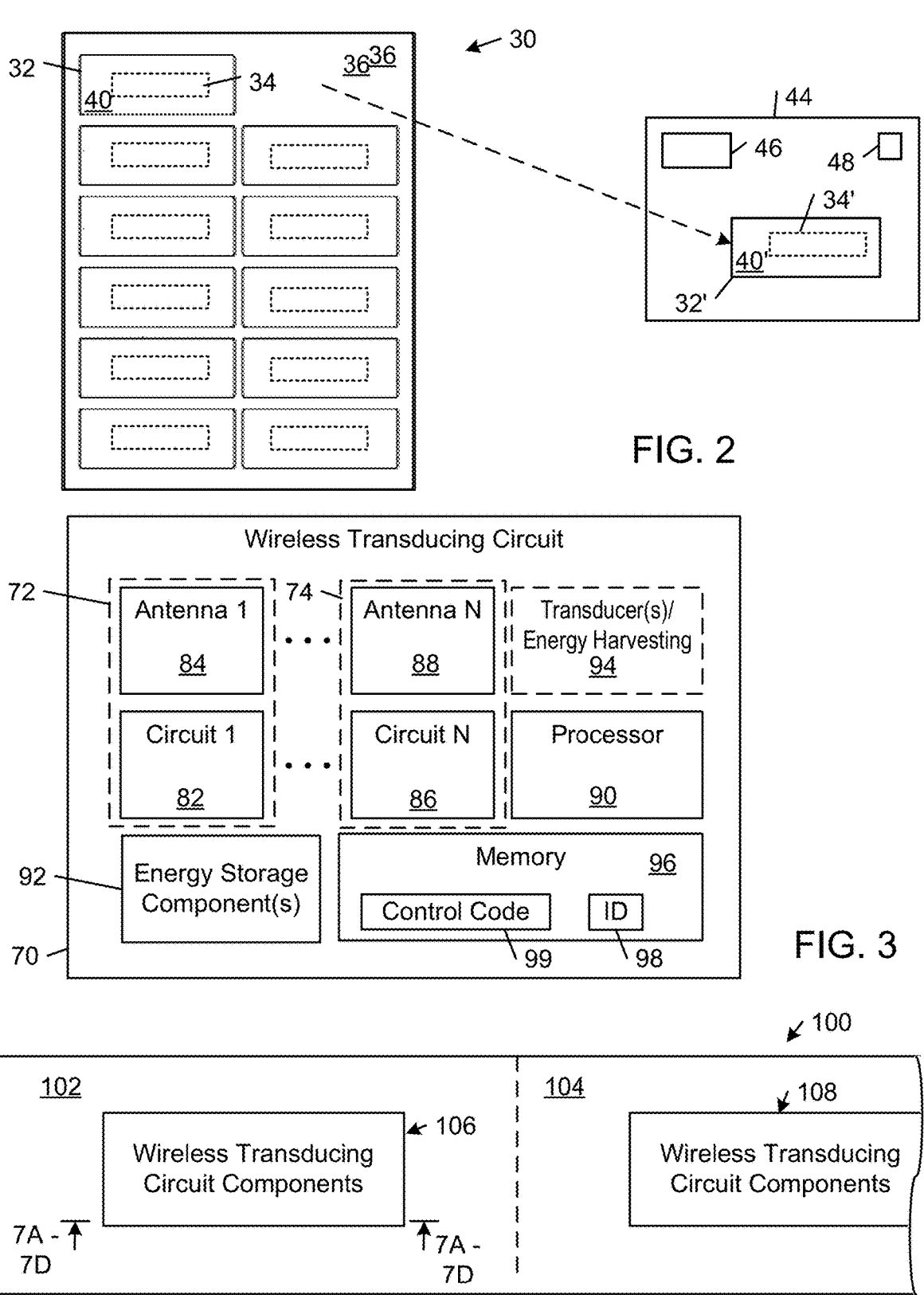
FIG. 2 is a diagrammatic view of an example of an envelope carrying a segment of an example adhesive tape platform dispensed from a backing sheet, according to some embodiments.
FIG. 3 is a schematic view of an example segment of an adhesive tape platform, according to some embodiments.
FIG. 4 is a diagrammatic top view of a length of an example adhesive tape platform, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
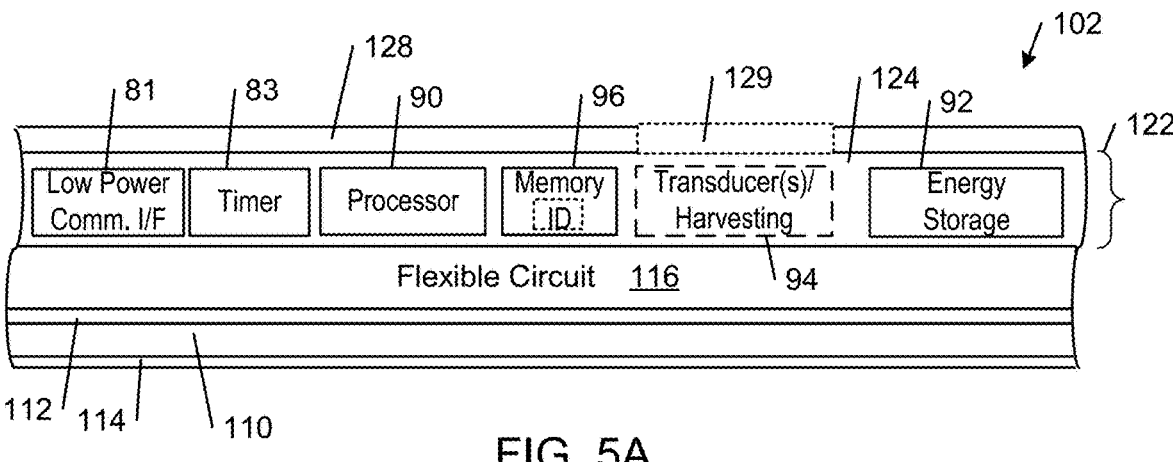
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
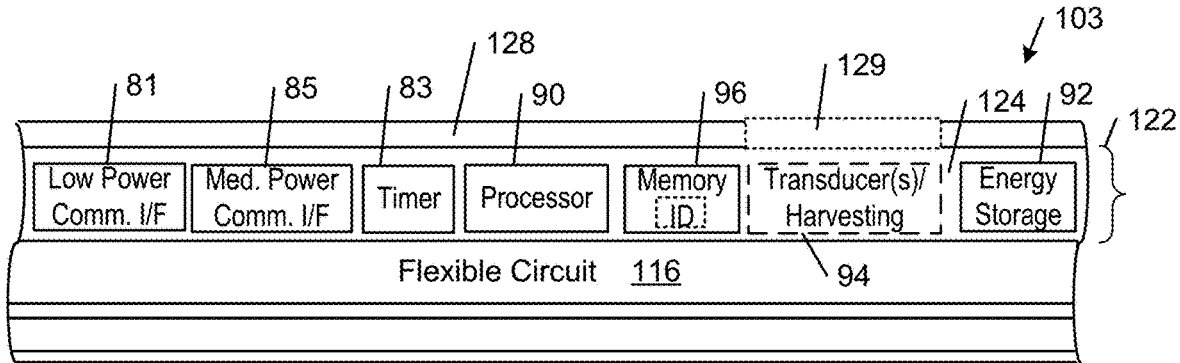

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
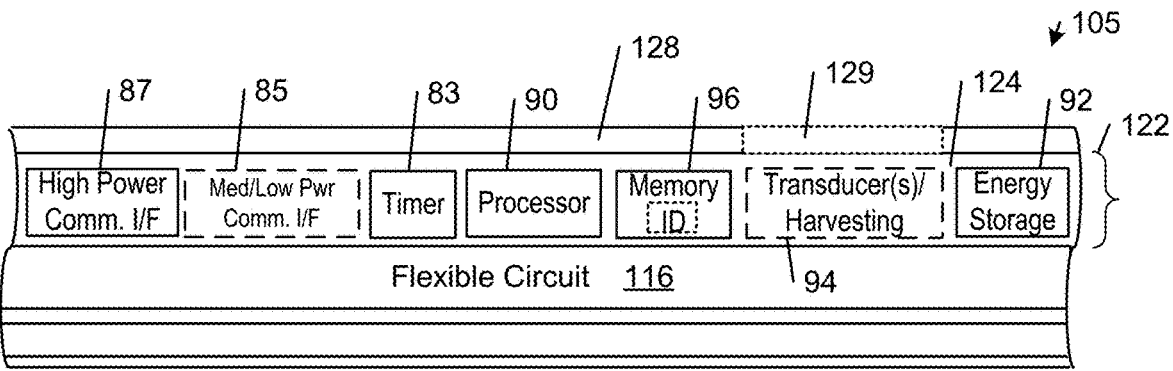

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and US Provisional Patent Application No. 62/670712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figures 6A, 6B, 6C:
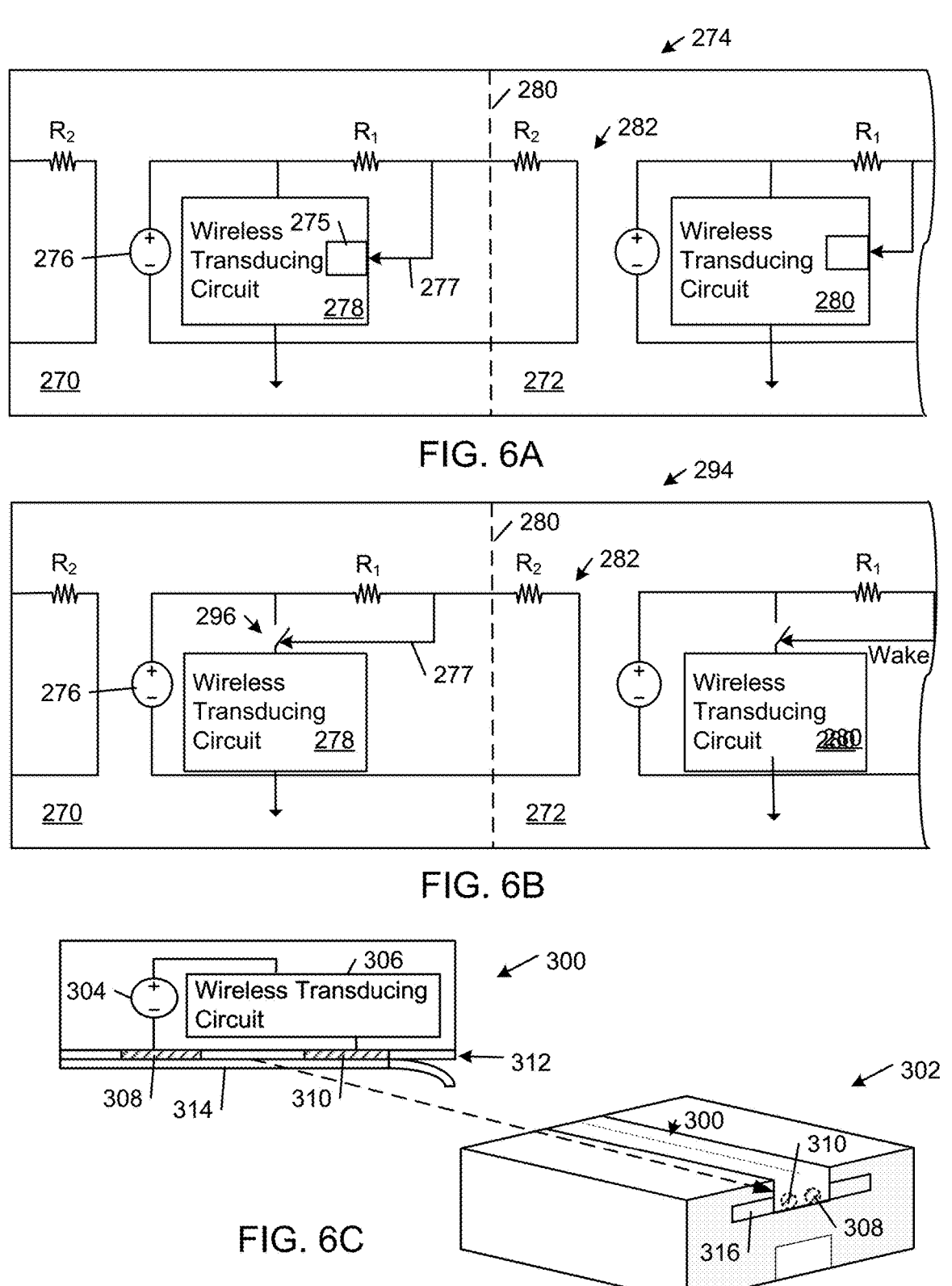
FIGS. 6A-6B are diagrammatic top views of a length of an example adhesive tape platform, according to some embodiments.
FIG. 6C is a diagrammatic view of a length of an example adhesive tape platform adhered to an asset, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
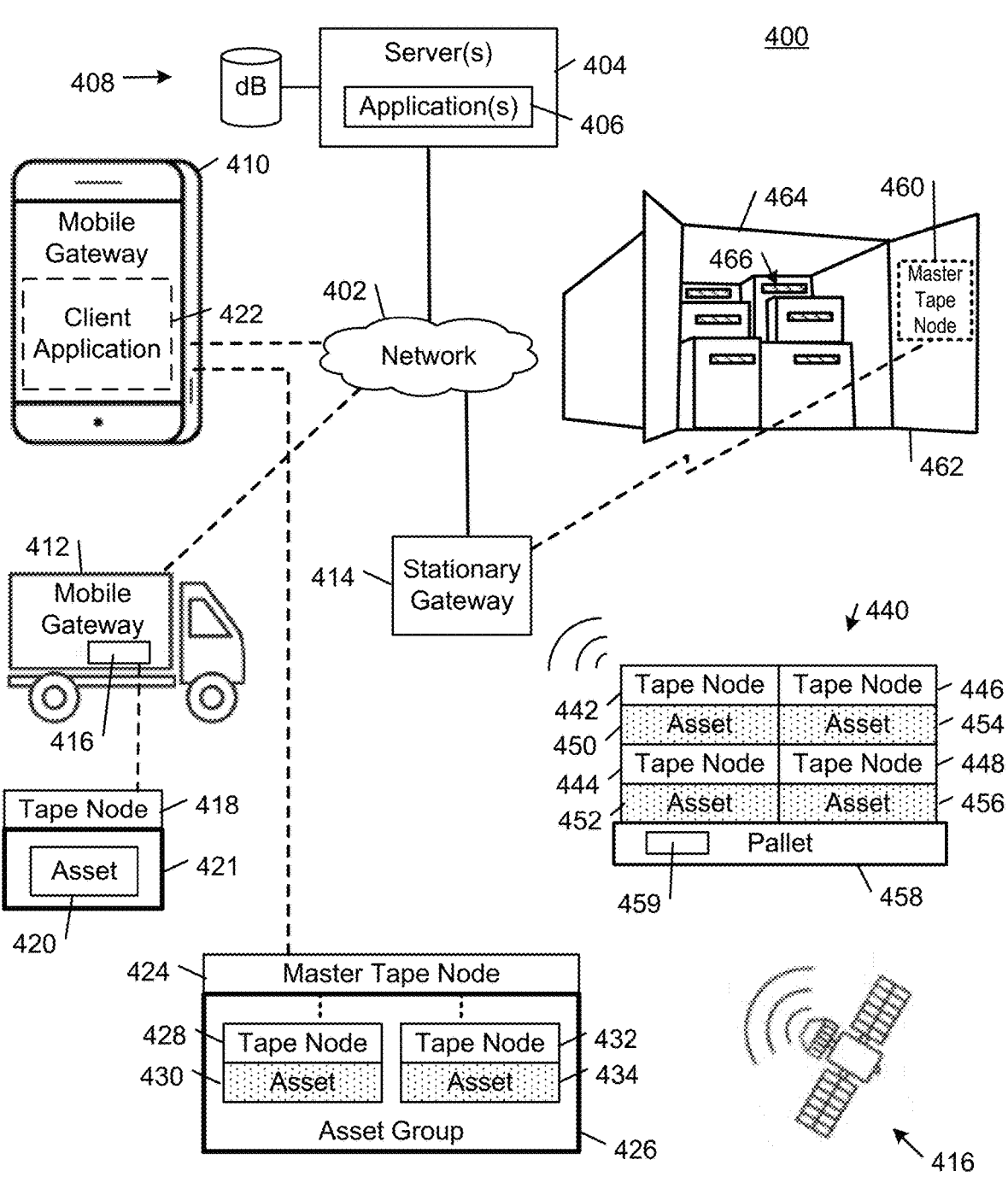
FIG. 7 is a diagrammatic view of an example of a network environment supporting communications with segments of an adhesive tape platform, according to some embodiments.

FIG. 7 shows an example network communications environment 400 (also referred to herein as an "TOT system" or "tracking system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above- mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost- effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
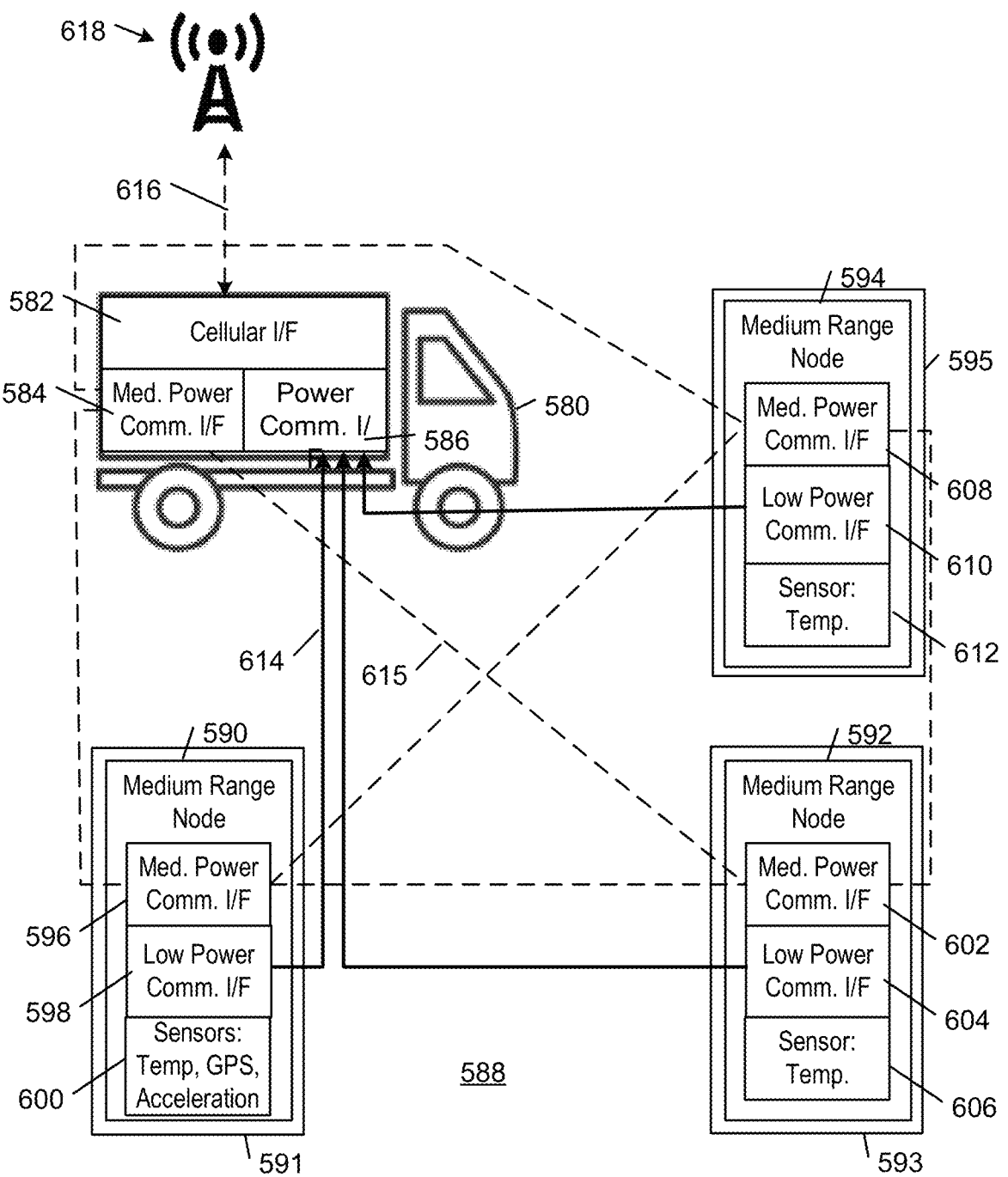

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non- responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
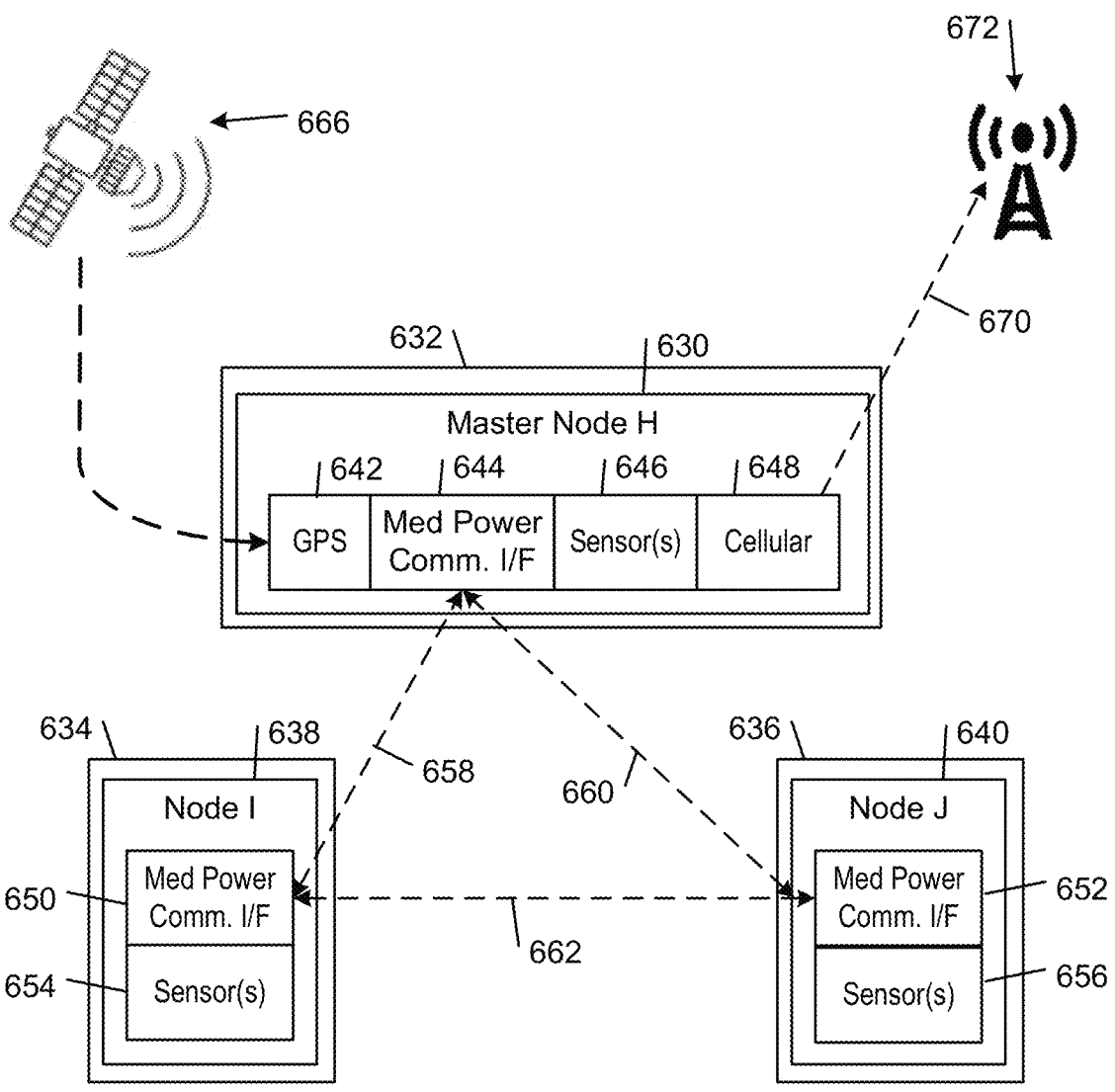

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

RFID for Locationing

Figure 11:
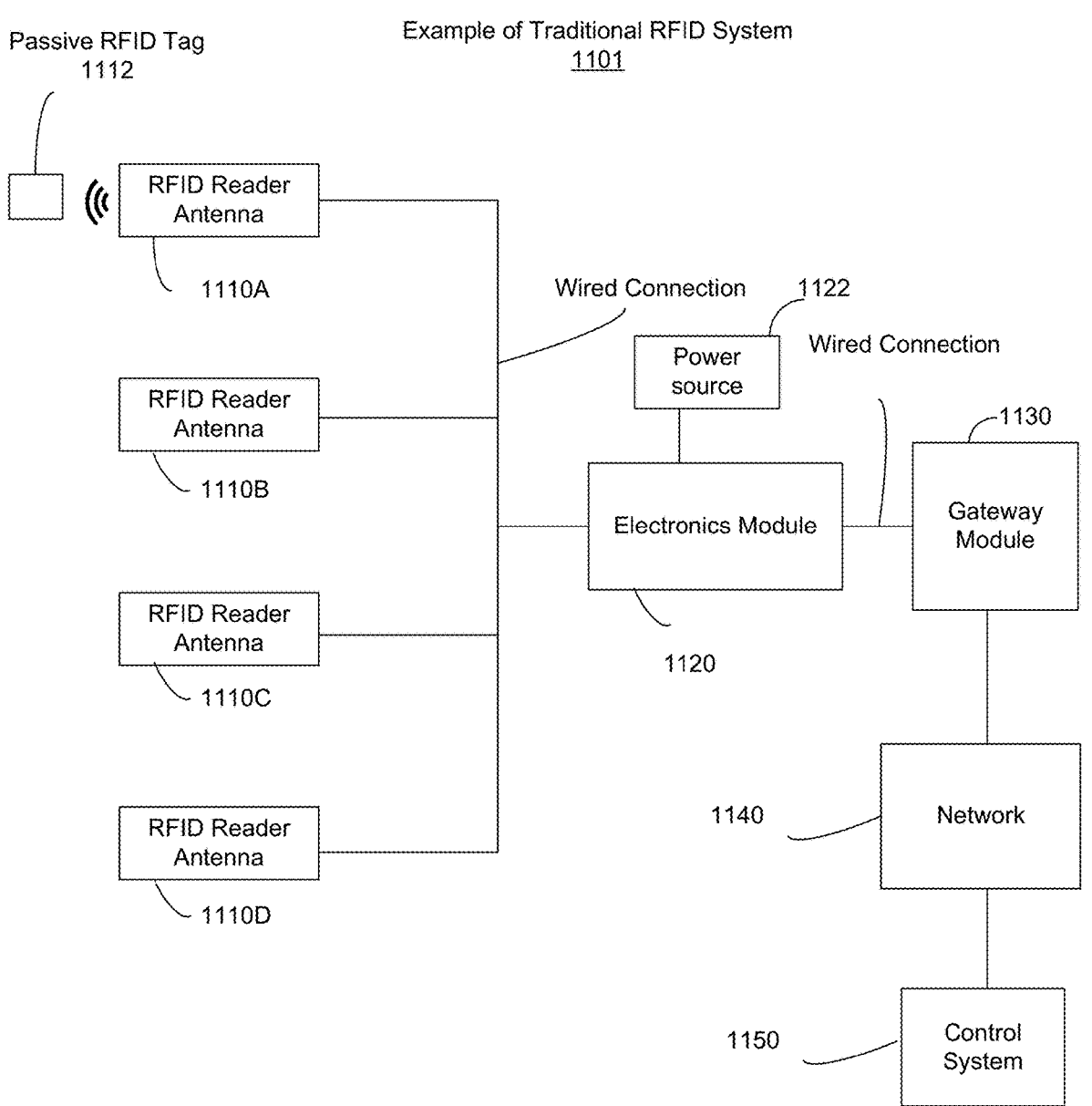
FIG. 11 is a diagram showing an example of a traditional RFID system used for locationing of RFID tags, according to some embodiments.

FIG. 11 is a diagram showing an example of a traditional RFID reader system 1101 used for locationing of RFID tags, according to some embodiments. A traditional RFID (radio frequency identification) reader system may include multiple RFID antenna modules 1110A-1110D (collectively referred to herein as RFID antenna modules 1110 or "reader antennas" 1110), which are wired (e.g., by a coaxial cable or an ethernet cable) in parallel to an RFID controller (also referred to herein as an RFID reader). The RFID controller may include an electronics module 1120 which includes electronics components and circuitry for operating the RFID antenna modules 1110, a gateway module 1130 for transferring RFID data scanned from RFID tags 1112 to a control system 1150, or some combination thereof. The RFID reader may be connected to a power source 1122 which provides electrical power to the electronics module and the reader antennas 1110. The RFID reader may communicate data directly to a control system 1150 that is connected to the RFID reader, or the RFID reader may communicate data over a network 1140 (e.g., local area network or through a wide area networks, such as the internet) to a control system 1150 that is remote or hosted on the cloud.

Each antenna module 1110 is a transceiver antenna at a different location in an environment where the RFID system 1101 is installed. Locationing of RFID tags 1112 is performed when an antenna module 1110A communicates with an RFID tag 1112 in a corresponding location. In order to communicate with passive RFID tags 1112, the electronics module 1120 generates an RFID interrogation signal (also referred to herein as an "RFID power-on signal" or "power on signal") that is provided to one of the reader antenna 1110A and transmitted from the reader antenna 1110A. The power on signal is a radio frequency (RF) wireless signal that is transmitted from the antenna module 1110A and received by an antenna of the passive RFID tag 1112. The passive RFID tag 1112 converts the power signal into electrical power using an RFID circuit in or on the RFID tag 1112, and uses the electrical power to power the electrical components of the passive RFID tag. For example, the passive RFID tag may include a memory that stores data such as identifiers, encryption data, decryption data, components for security, components for signal processing, and other components. The antenna, RFID circuit, and components of the RFID tag 1112 may be part of an RFID chip or integrated circuit.

The passive RFID tag 1112 when powered on, reads out data from a memory of the passive RFID tag 1112 and generates a response signal that is transmitted from the RFID tag. The antenna module 1110A receives the response signal or a superposition of the response signal and reflections of the interrogation signal, both of which may be referred to herein as the "response signal." The electronics module 1120 then receives the signal from the reader antenna 1110A, interprets the response signal, and converts it to data that can be stored or transmitted to a server, network 1140, a client device, a control system 1150 or some other node of the RFID system via the gateway module 1130. The gateway module 1130 may be connected to the electronics module 1120 by a wired connection and may be located in different location than the electronics module 1120. The gateway relays the data received in RFID communications between the readers and the passive RFID tags to other nodes of the RFID system, such as a network, a server, or a client device. The antennas 1110, electronics module 1120, and gateway 1130 may be physically separate from each other and distant, requiring extensive wired infrastructure through an environment where the RFID system 1101 is installed.

Installation of a traditional RF system 11101 may be complicated requiring extensive wiring and changes to the infrastructure of a building or environment. In a traditional RFID system 1101, the RFID reader may consume a large amount of electrical power, may be expensive to install and operate, and may be inaccurate in tracking the location of a passive RFID tag. In some cases, the traditional RFID system suffers from multi-path interference caused by the environment, signal attenuation, or limitations in the sensitivity of the RFID reader due to the environment or installation constraints. In some cases, each antenna module may each require a separate power supply that's connected to external power (e.g., outlet), which places additional constraints on where reader antennas 1110 may be installed in an environment without requiring bothersome infrastructure changes.

Improved RFID System for Minimal Installation

Discussed below are various examples of improved RFID readers system configurations and hybrid RFID reader system configurations. Each of the RFID reader systems discussed below may be integrated with the tracking system 400 shown in FIGS. 7-10E. Wireless communication gateway modules and gateways, as discussed below, may include components of the wireless transducing circuit 70 and are configured to wirelessly communicate with one or more wireless nodes of the tracking system 400. The improved and hybrid RFID readers systems described herein may be used to track assets in the tracking system 400, some of which may be equipped with adhesive tape platform nodes, passive RFID tags, active RFID tags, adhesive tape platform nodes that are integrated with RFID tags or inlays, or some combination thereof. An RFID control system (e.g., control system 1250, 1350, 1450), as discussed below, includes software and/or hardware for collecting RFID data, tracking RFID communications, communicating with the RFID reader systems, and controlling the RFID reader systems. An RFID control system may be executed and stored on a client device, a server, or hosted on the cloud.

Figure 12A:
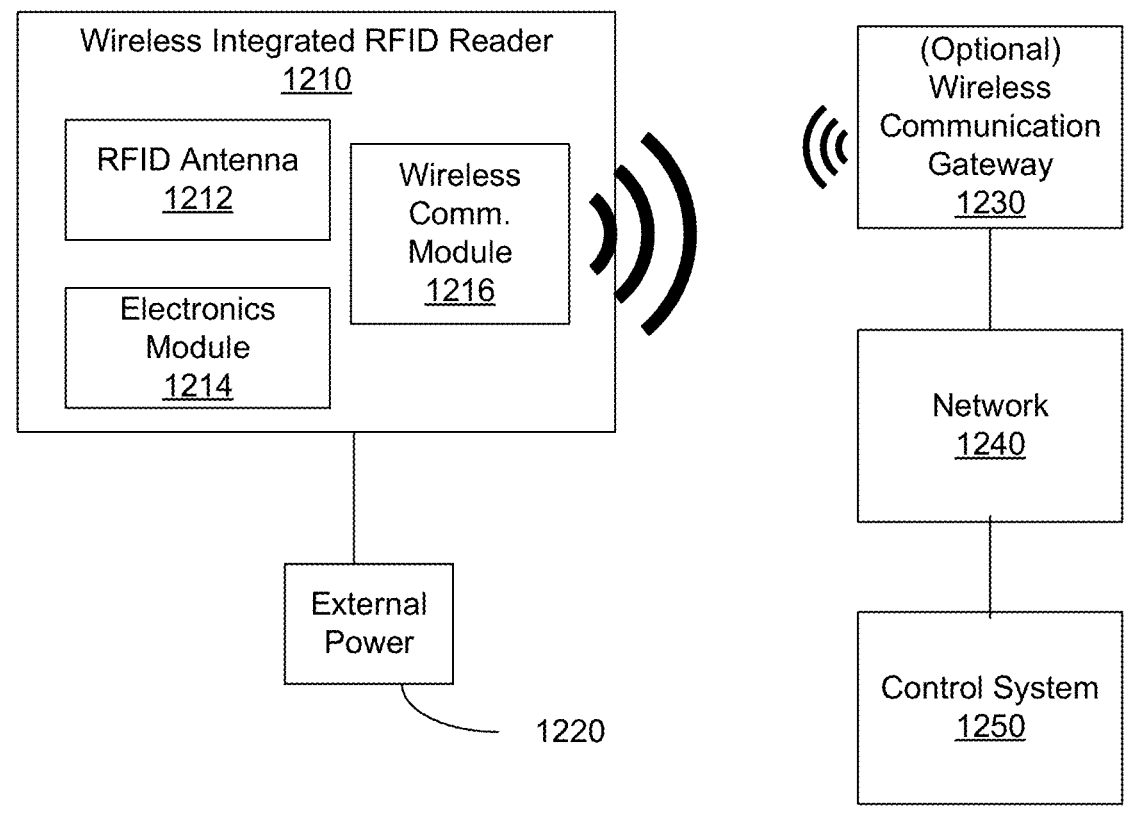
FIG. 12A is a diagram showing an improved RFID system including a wireless integrated RFID reader, according to some embodiments.

FIG. 12A is a diagram showing an example of an improved RFID system 1201 including a wireless integrated RFID reader 1210, according to some embodiments. The wireless integrated RFID reader 1210 is a device that includes an RFID reader antenna 1212, a wireless communication module 1216 (also referred to herein as a "wireless gateway module" 1216), and an electronics module 1214 for controlling the RFID reader antenna 1212 integrated into a single device. The wireless integrated RFID reader 1210 may be installed in a location without needing a wired connection over a long distance to a traditional RFID controller, like the traditional RFID reader system 1101. Instead, the integrated RFID reader 1210 includes all the components necessary to operate the RFID reader and antenna in the device and is able to transmit data scanned from RFID tags over a wireless communication connection to a gateway 1230 that is located within a wireless communication range of the wireless integrated RFID reader 1210 and configured to collect data from wireless integrated RFID readers in the environment. The gateway 1230 may then provide the collected data to a control system 1250 over a local connection or through a network 1240, such as via an internet connection. In other embodiments, the wireless communication module 1216 may include a long-range wireless communication system for connecting to a wide area network, such as a cellular communication system (e.g. 2G, 3G, 4G, LTE, and 5G communication systems) and may communicate data to a control system 1250 via a network 1240, such as through an internet connection. Each wireless integrated RFID reader 1210 may be connected directly to an external power supply 1220, such as an electrical power outlet, according to some embodiments.

Since each integrated RFID reader module 1210 has its own electronics module 1214 and gateway 1216 integrated with the antenna module 1212, the need for wired connections between the RFID reader module 1210 and other components of the improved RFID reader system 1201 are minimized. This simplifies installation and reduces the need to modify the infrastructure or install additional wiring in an environment. The integrated wireless communication module 1216 may be a wireless gateway or wireless communication node which can communicate the data received from RFID tags using a wireless communication system(e.g., Bluetooth, LoRa, Cellular communications, satellite communications, etc.) to another wireless node of the tracking system 400.

Each wireless integrated RFID reader 1210 only needs to be wired for electrical power or plugged into an external power source (e.g., power outlet, battery, generator, etc.), unlike the traditional RFID reader system 1101 which requires a wired connection between each reader antenna 1110 and an RFID reader 1120. In some embodiments, the wireless integrated RFID reader 1210 may include a battery for powering the wireless integrated RFID reader 1210 that allows the wireless integrated RFID reader 1210 without needing to receive power from an external power source 1220. This allows for even more versatility in installing and positioning components of the improved RFID reader system 1201. The battery may be rechargeable, in further embodiments.

The integrated communication module 1216 includes one or more wireless communication systems for relaying data over a wireless communication connection. The communication module 1216 may be an embodiment of an adhesive tape platform node or include an embodiment of the wireless transducing circuit 70. The communication module 1216 may include a WiFi communication system and may connect to the internet via a WiFi access point. For example, the gateway 1230 may include a WiFi access point that provides internet connectivity to the communication module 1216. In other embodiments, the communication module 1216 includes a cellular communication system for communicating with the cloud or a control system 1250 through an internet or data connection. In alternate embodiments, the integrated gateway module 1220 may be wired into a nearby local area network (LAN). For example, the integrated RFID reader 1210 may include a wired ethernet connection that carries power and data between the integrated RFID reader and a gateway 1230. This may be the case in environments where ethernet connections are readily available.

Figure 12B:
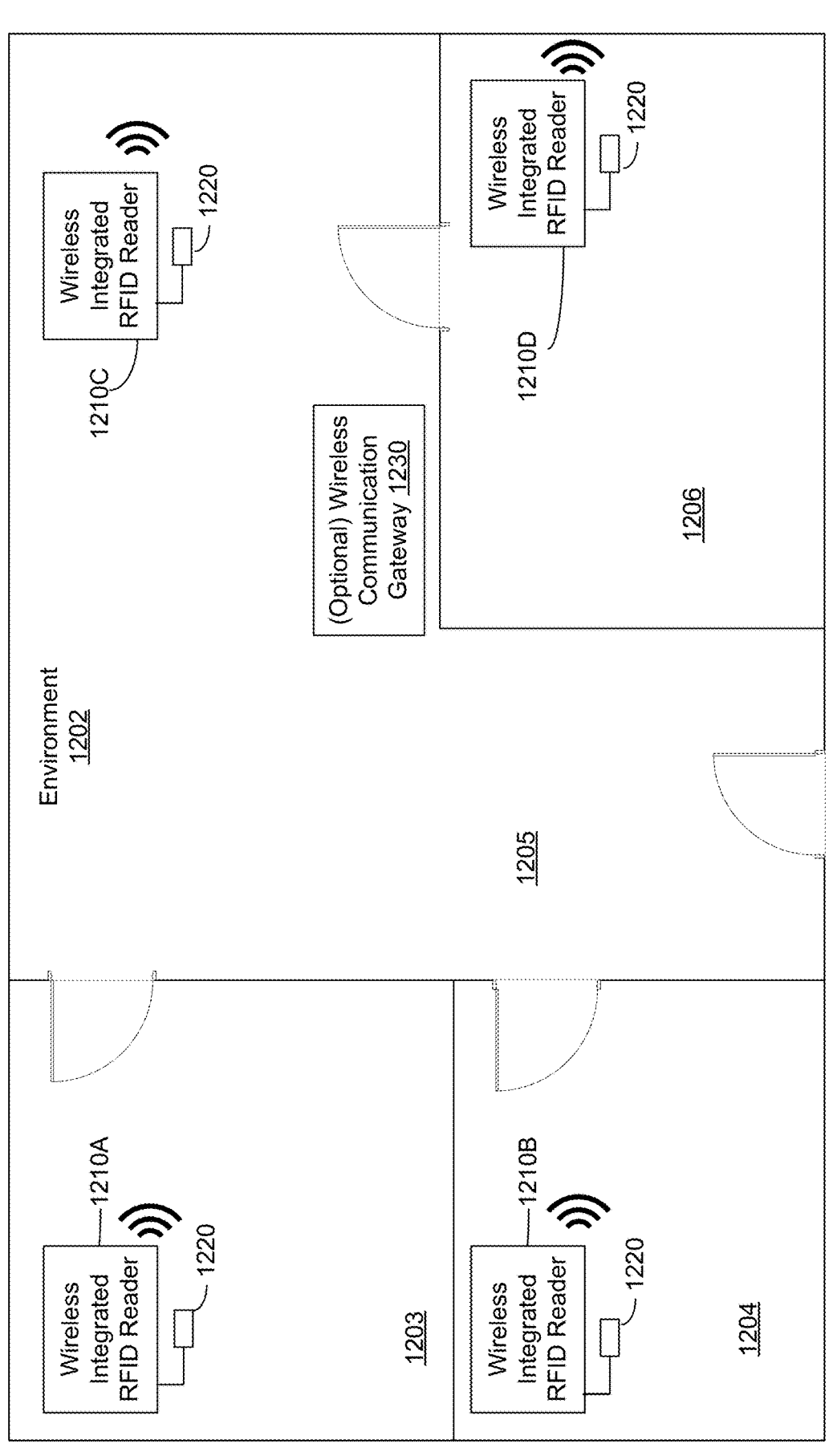
FIG. 12B is a diagram of an example environment of the improved RFID system of FIG. 12A, according to some embodiments.

FIG. 12B is a diagram of an example environment 1202 where an embodiment of the improved RFID system 1201 of FIG. 12A is installed, according to some embodiments. A wireless integrated RFID reader is installed in each of a plurality of areas 1203-1206 in the environment 1202. Some of the areas 1203, 1204, 1206 may be different rooms in a building, for example. However, in other embodiments, the areas may be parts of a different environment, such as an outdoor environment. Each wireless integrated RFID reader 1210A-1210D is associated with a corresponding area 1203-1206 and performs communications with RFID tags to locate the RFID tags in one of the areas 1203-1206 for the tracking system 400. Each of the wireless integrated RFID readers performs RFID communications with RFID tags in their respective areas and communicates scanned RFID data back to the wireless communication gateway 1230 over a wireless communication connection. For example, the RFID data may be transmitted to the gateway 1230 via a Bluetooth or LoRa communication connection. The gateway 1230 may then store the RFID data on a memory or storage of the gateway 1230 and communicate the data back to a controller 1250 via an internet or local area network connection, according to some embodiments.

In other embodiments, the gateway 1230 communicates the data with a wireless node of the tracking system 400 using a wireless communication connection. The wireless node may be a client device, an embodiment of a tape node, a mobile gateway, or some other wireless node of the tracking system 400. For example, a user with a client device searching for a particular RFID tag may enter the environment 1202 and use the client device to retrieve the RFID data from the gateway 1230 that is either stored on a memory of the gateway 1230 or relayed by the gateway 1230 from one of the wireless integrated RFID readers 1210A-1210D.

Figure 13A:
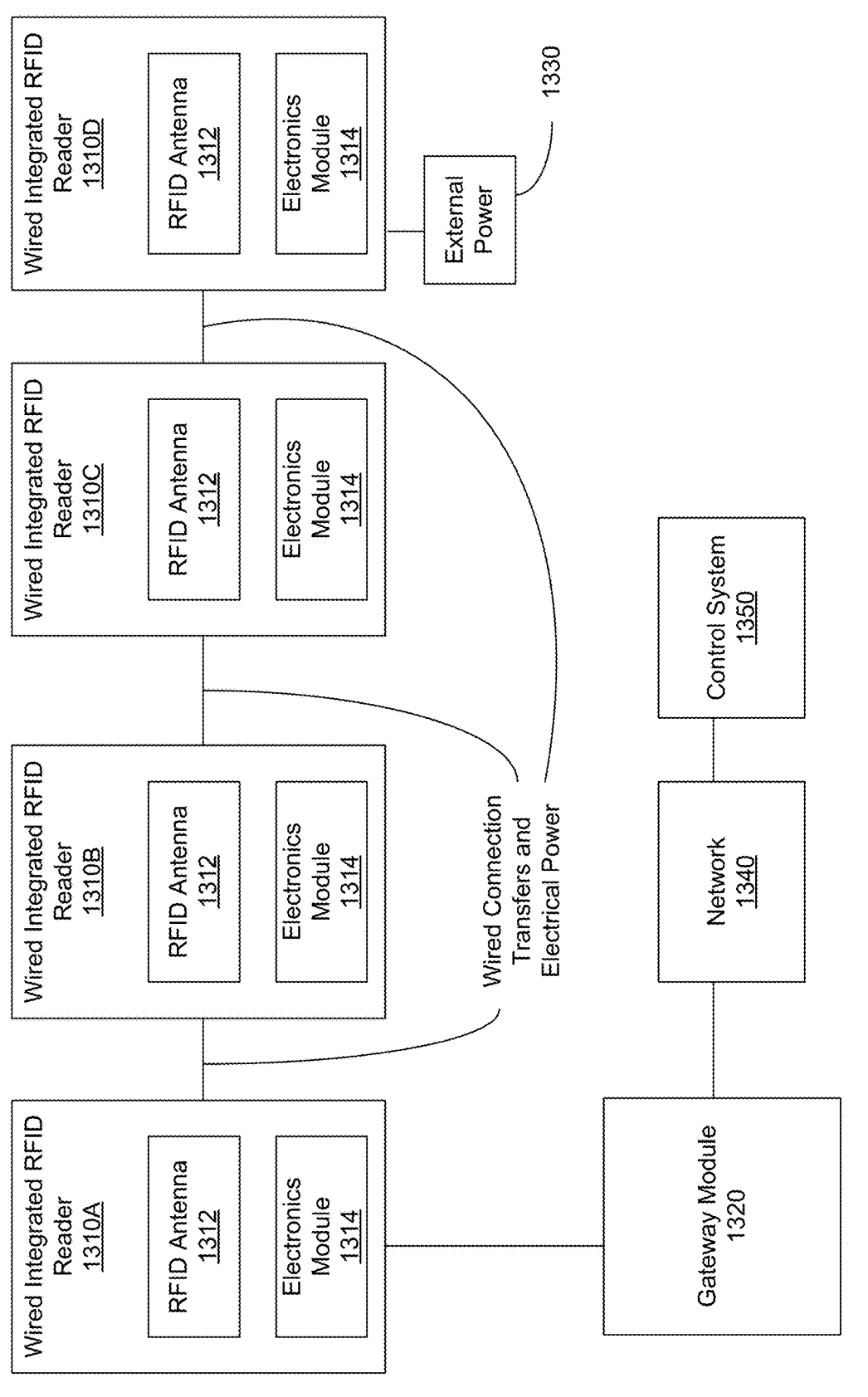
FIGS. 13A-13C are diagrams of various embodiments of an improved RFID system including concatenated integrated RFID readers, according to some embodiments.
Figure 13B:
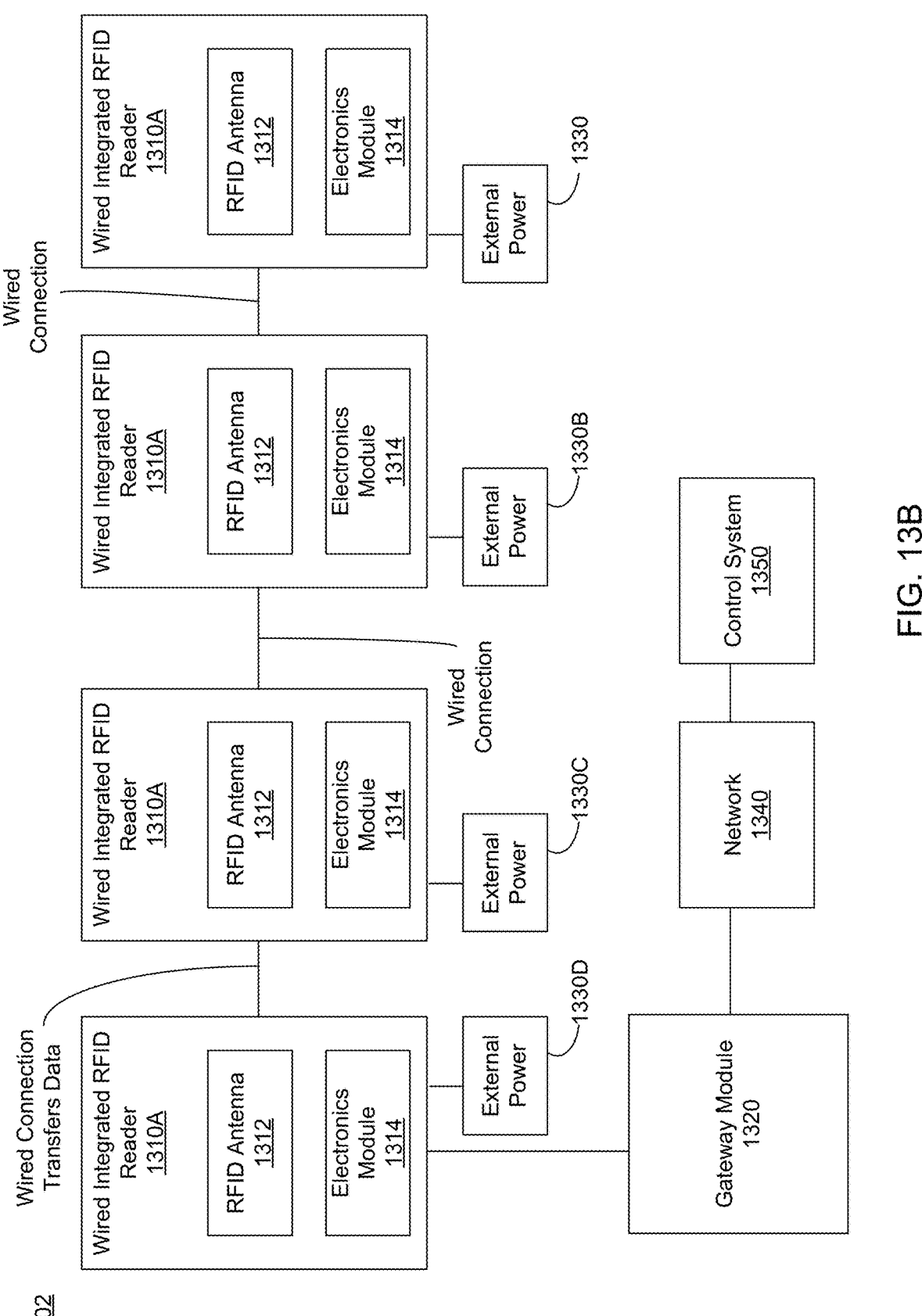
Figure 13C:
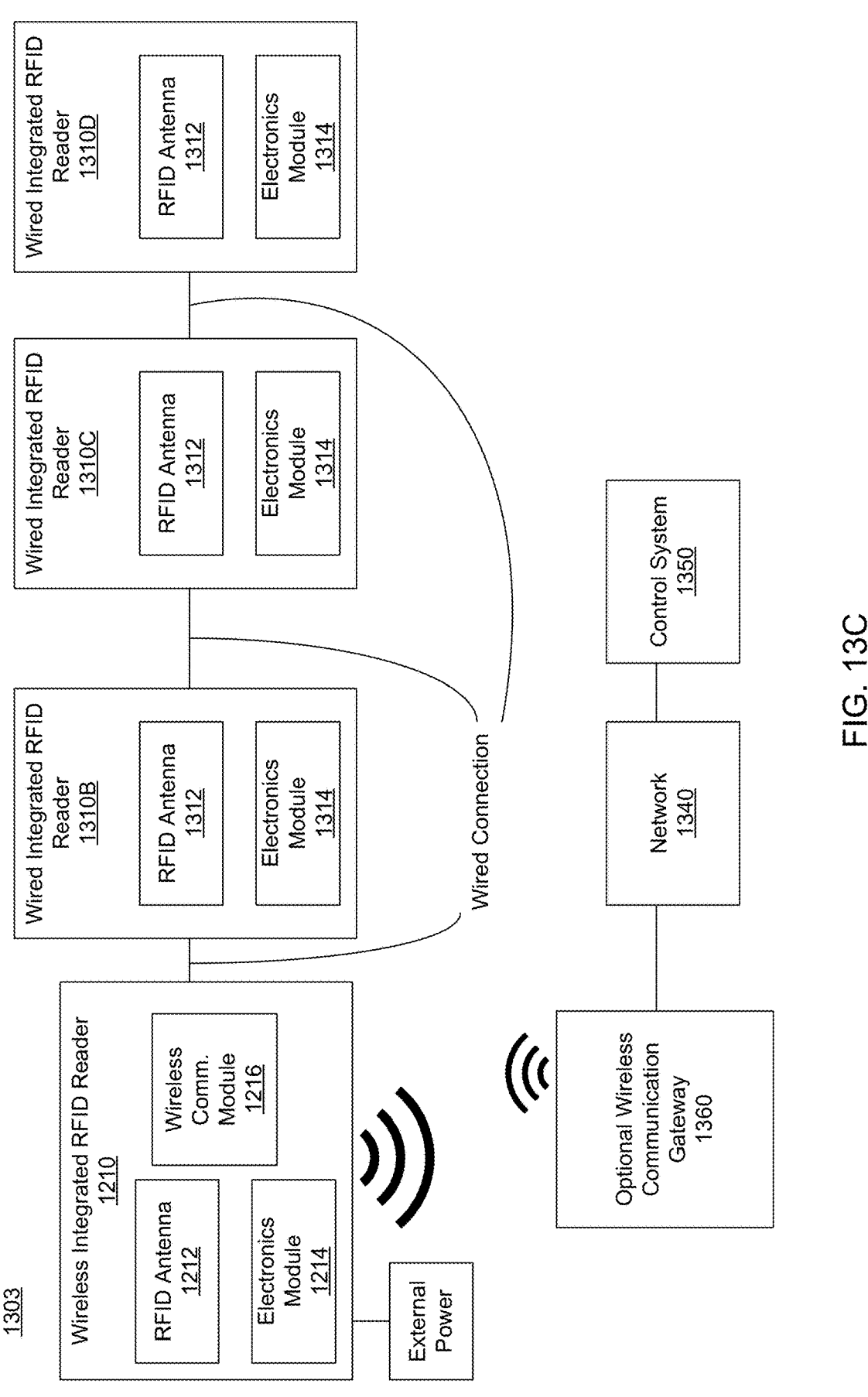

FIGS. 13A-13C are diagrams of various embodiments of an improved RFID system including concatenated integrated RFID readers, according to some embodiments. FIG. 13A shows an example schematic diagram of a configuration for an improved RFID reader system 1301 that includes wired integrated RFID reader modules 1310A-1310D (collectively referred to herein as wired integrated RFID readers 1310 or "integrated RFID readers" 1310) that are each installed at a different location in an environment. The wired integrated RFID readers 1310 are concatenated or connected by wired connections in series in a daisy chain. The wired integrated RFID readers 1310 include the same components and capabilities of the wireless integrated RFID reader 1210, except for the wireless communication module 1216. Instead, the wired integrated RFID reader 1310 transfers data to a gateway module 1320 or a client device via data transmission over wired connections.

The wired connections between each wired integrated RFID reader 1310 carries data between each of the wired integrated RFID reader 1310. Each wired integrated RFID reader 1310 may include a passthrough or relay for relaying data along the daisy chain up to the gateway module 1320, in some embodiments. For example, the wired integrate RFID reader 1310D may scan RFID data from a passive or active RFID tag and transmit the scanned data to the integrated RFID reader 1310C. The data from reader 1310D is then passed along from integrated RFID reader 1310C to integrated RFID reader 1310B, which in turn relays the data along the daisy chain to integrated RFID reader 1310B, integrated RFID reader 1310A, and then to the gateway module 1320. The gateway module 1320 may then collect the RFID data and send it to the control system 1350 over a network 1340 (e.g., the internet or a local area network), to a client device, or to another node of the tracking system 400 in some embodiments.

In some embodiments, the wired connections between the integrated RFID readers 1310 may be made using ethernet cables, coaxial cables, or other types of cable that carry data communications. In further embodiments, power for each of the integrated RFID readers 1310 may be carried by the wired connections, with only one of the wired integrated RFID readers 1310D connected to a power source 1330. In other embodiments, multiple of the wired integrated RFID readers 1310 may be individually connected to a power source, as shown in the schematic diagram of FIG. 13B. The data received by an antenna module via a wired connection from a previous antenna module in the chain is passed through via a passthrough channel to the next antenna module via the respective wired connection up the chain to a final antenna module connected (wirelessly or via a wired connection) to a gateway. The passthrough channel may include a communication circuit for storing, transmitting, and receiving data.

Since the concatenated integrated RFID reader modules 1310 are connected in series, the wiring installation is simpler than a system that is connected in parallel, where each of the RFID antenna modules needs to be connected directly to an RFID reader. In some embodiments, more than one of the integrated RFID reader modules 1310 may be connected directly to the gateway module 1320.

FIG. 13C shows an alternate configuration for the improved RFID reader system 1303 that includes a combination of wired integrated RFID reader modules 1310B-1310D and wireless integrated RFID reader modules 1210 that are each installed at a different location in an environment. The configuration shown in FIG. 13C functions similarly to the one shown in FIG. 13A, except that instead of having one of the concatenated wired integrated RFID readers 1310 connected directly via a wired connection to a gateway module 1320, at least one of the wired integrated RFID readers 1310 is connected via a wired connection to a wireless integrated RFID reader module 1210 that includes a wired connection port for wired communications. The wireless integrated RFID reader module 1210 receives RFID data from the daisy chained wired RFID readers 1310B-1310D and relays the RFID data to a wireless gateway 1360 or communicates the data to a control system 1350 using wireless communication. The wireless integrated RFID reader module 1210 also sends RFID data that it scans itself from RFID tags to the gateway 1360 or to the control system 1350. Although only one wireless integrated RFID reader module 1210 is shown in FIG. 13C, there may be multiple wireless integrated RFID reader modules 1210 connected to the wired integrated RFID readers 1310B-1310D, according to some embodiments.

The configuration shown in FIG. 13C allows for installation in a diverse range of environments with fewer requirements for adding wired infrastructure or planning out the positions and resources for RFID antennas.

Figure 14:
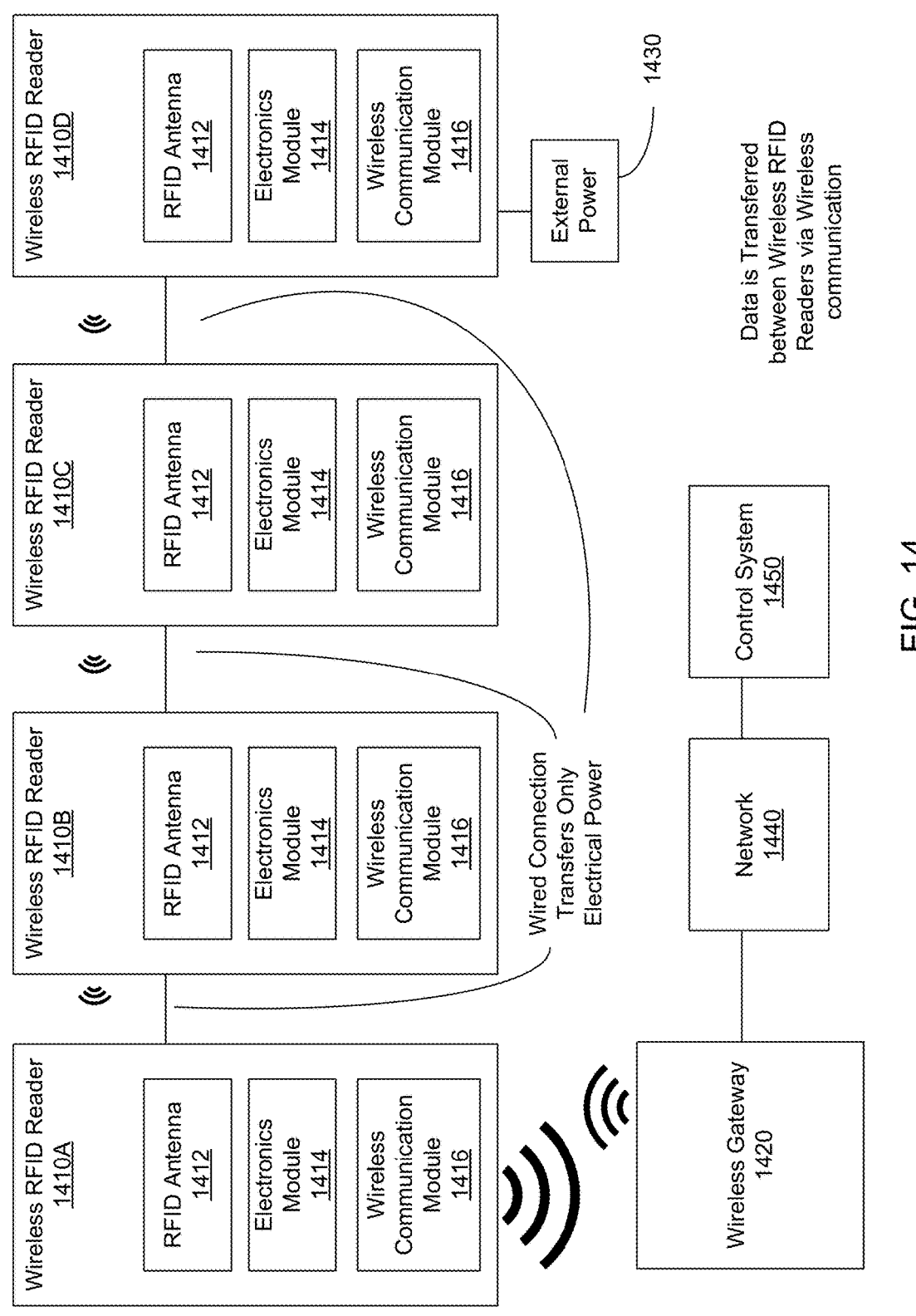
FIG. 14 is a diagram of an improved RFID system including wireless RFID readers, according to some embodiments.

FIG. 14 is a diagram of an improved RFID system 1401 including wireless RFID readers, according to some embodiments. The improved RFID system 1401 includes multiple wireless RFID readers 1410A-1410D (collectively referred to as "wireless integrated RFID readers" 1410, "integrated RFID readers" 1410, or "wireless RFID readers" 1410) that are each installed in a different location of an environment. Each of the wireless RFID readers 1410 may be an embodiment of the integrated wireless RFID reader 1210. In the embodiment shown in FIG. 14, the wireless RFID readers 1410A are concatenated and connected via a daisy chain of wired connections that transfer electrical power to each of the wireless RFID readers 1410 from one or more wireless RFID readers 1410D that are connected to a power source. In other embodiments, each of the wireless RFID readers may be individually connected to a power source or may include a battery, allowing for the improved RFID reader system 1401 to operate without any wired connections between the wireless RFID readers 1410.

RFID data scanned from RFID tags by one of the wireless RFID readers 1410B-1410D is relayed to the wireless integrated RFID reader 1410A over wireless communication connections between the wireless RFID readers 1410. The wireless integrated RFID reader 1410A then relays the data over a wireless communication connection to the wireless gateway 1420, according to some embodiments. For example, the wireless RFID reader 1410C may scan data from an RFID tag and transmit the data to a closest wireless RFID reader 1410B over a wireless communication connection. The wireless RFID reader 1410B receives the RFID data over the wireless communication connection and relays the data by transmitting it to the wireless RFID reader 1410A. The wireless RFID reader 1410A receives the RFID data and relays it to the wireless gateway 1420.

The wireless gateway 1420 then collects the RFID data from the wireless RFID readers 1410 and stores or sends the data to the control system 1450, for example over a network 1440. In some embodiments, the wireless RFID reader 1410A is able to connect the control system 1450 direclty or via the network 1440 without communicating with a gateway 1420, for example, via a cellular communication system onboard the wireless RFID reader 1410A.

In alternative embodiments, one of the wireless RFID readers 1410 has a wired connection to the gateway 1420 and communicates to the gateway 1420 over the wired connection. In this case, the wireless RFID readers 1410A-1410D may still communicate and relay data amongst each other using wireless communications, but at least some of the data is relayed to the gateway 1420 using a wired communications from the one of the wireless RFID readers.

The improved RFID reader systems above may include a different number or type of components than is shown in FIGS. 12A-14, according to some embodiments. For example, the improved RFID reader system 1201 may include more or less wireless integrated RFID reader modules 1210 than the four shown in FIG. 12B. Additionally, the improved RFID reader systems described above may include different configurations, arrangements, and connections than shown in FIGS. 12A-14. In other examples, multiple of the wireless integrated RFID readers and wired integrated RFID readers in an improved RFID reader system may be installed at a same or similar location in an environment.

Hybrid RFID System for Improved Locationing

Figure 15:
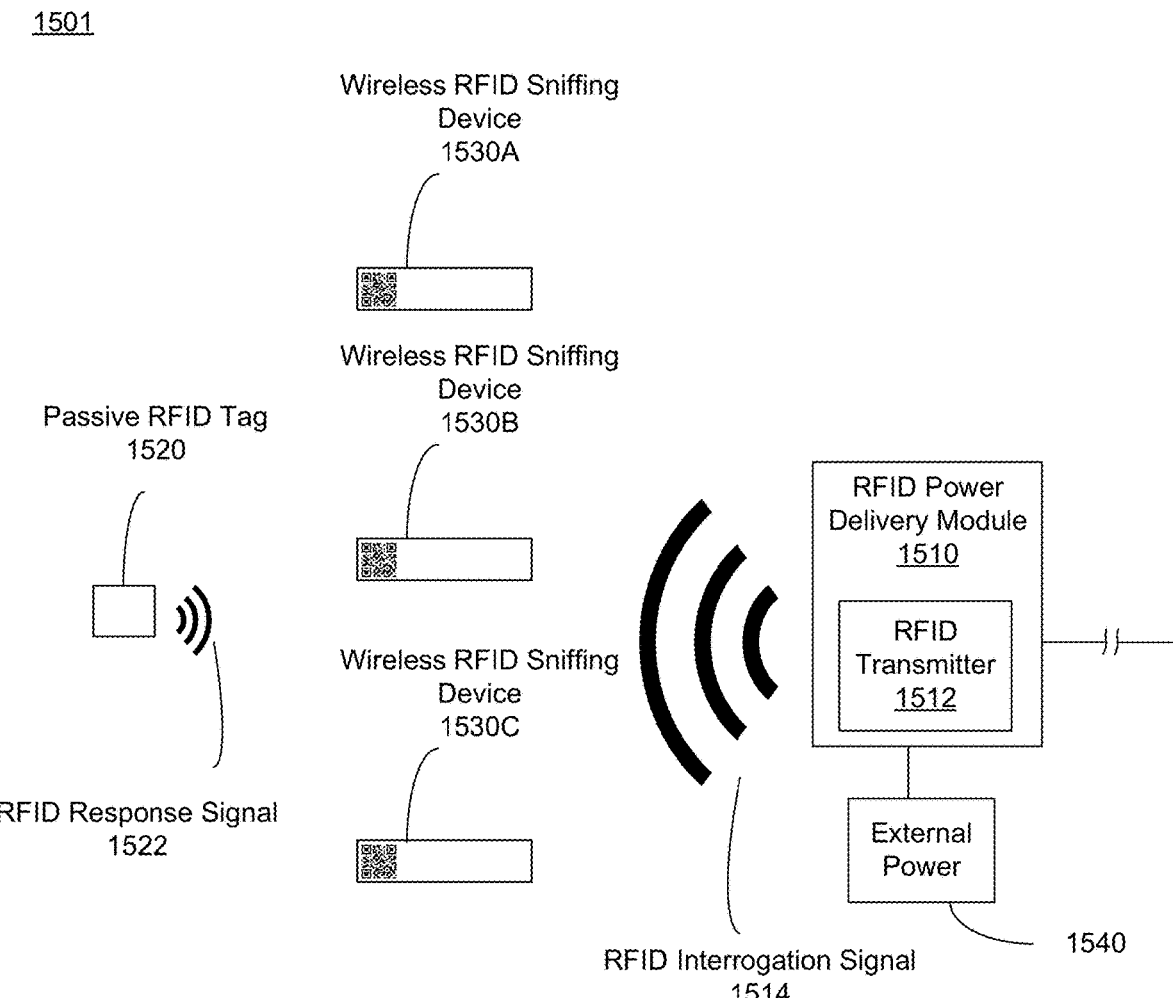
FIG. 15 is a diagram of an improved RFID system for locationing that includes separate devices for supplying wireless RFID power and for reading the RFID signals in an environment, according to some embodiments.

FIG. 15 is a diagram of a hybrid RFID system 1501 for locationing that includes separate devices for emitting the RFID interrogation signal 1514 that powers passive RFID tags and for reading the RFID response signals 1522 from RFID tags 1520 in an environment, according to some embodiments. An RFID interrogation signal used to provide electrical power to passive RFID tags may also be referred to herein as a "RFID Power-On Signal" or an "RFID Power Signal." According to some embodiments, the hybrid RFID System 1501 includes one or more RFID Power Delivery module 1510 modules, one or more wireless RFID reader modules, and one or more passive RFID tags 1520. The one or more wireless RFID reader modules may include wireless RFID sniffing devices 1530A-1530C (collectively, wireless RFID sniffing devices 1530).

A wireless RFID sniffing device is an embodiment of the wireless integrated RFID reader 1210. The wireless RFID sniffing device may be a battery powered device, in some embodiments. In other embodiments, the wireless RFID sniffing device may include energy harvesting components. For example, the wireless RFID sniffing device may include a solar panel for converting light energy to electrical energy. A wireless RFID sniffing device is configured to receive RFID signals, including RFID response signals generated by passive RFID tags in response to an RFID interrogation signal and RFID interrogation signal. The RFID sniffing device may not be configured to transmit or emit an RFID interrogation signal, but is not limited to devices that are not configured to transmit or emit an RFID interrogation signal. In some embodiments, an RFID sniffing device is an embodiment of an adhesive tape platform, as discussed further below with respect to FIGS. 17A-17B. Although FIGS. 15-16 and 19-20 show the wireless RFID sniffing devices 1530 as being adhesive tape platform devices, the wireless RFID sniffing devices are not limited to.

In some embodiments, the RFID power delivery module 1510 is connected to an external power source 1540 or power supply 1540. For example, the RFID power delivery module may be connected to an electrical power line or an electrical power outlet. In other embodiments, the external power source 1540 is a battery. In alternate embodiments, the RFID power delivery module 1510 includes a battery integrated with the RFID power delivery module 1510. In this case, the battery of the RFID power delivery module 1510 may have a larger energy storage capacity than a battery of one or more of the wireless RFID sniffing devices 1530.

The RFID power delivery module 1510 includes an RFID transmitter 1512 that includes an RFID antenna and RFID electronics components for generating the RFID interrogation signal. The RFID power delivery module may include a processor, memory, and other components for programmatically controlling the RFID power delivery module 1510. In some embodiments, the RFID power delivery module also includes one or more wireless or wired communication systems for communicating with wireless nodes of the tracking system 400. For example, the RFID power delivery module 1510 may be remotely controlled by a control system, such as the control system 1250 which communicates instructions to the RFID power delivery module 1510 over wired or wireless communications. The RFID power delivery module may also function as the wireless communication gateway 1230 or may be integrated in a single device with a wireless communication gateway 1230, in some embodiments, for retrieving RFID data and other data from the wireless RFID sniffing devices 1530 over wireless communications. In some embodiments, the RFID power delivery module 1510 does not include a receiver for receiving RFID signal and only functions to emit the interrogation signal 1514 into the environment. In other embodiments, the RFID power delivery module 1510 may include a full RFID reader that can emit the RFID interrogation signal 1514 and receive RFID signals from RFID tags. For example, the wireless RFID sniffing devices 1530 may supplement the RFID power delivery module's 1510 ability to receive RFID signals, when the RFID power delivery module 1510 is a full RFID reader.

The RFID interrogation signal 1514 is received at an antenna of the passive RFID tag 1520 and converted to electrical power for powering the passive RFID tag 1520. Once powered, the passive RFID tag 1520 generates an RFID response signal 1522 encoded with data stored on a memory of the passive RFID tag 1520 that is emitted back into the environment. At least one of the wireless RFID sniffing devices 1530 receives a superposition of the RFID response signal 1522 and the RFID interrogation signal 1514 at an antenna of the at least one wireless RFID sniffing devices 1530. The at least one wireless RFID sniffing device decodes the RFID response signal from the received superposition of RFID signals and retrieves the data encoded into the RFID response signal by the passive RFID tag. The at least one wireless RFID sniffing device then wirelessly communicates the retrieved RFID data to a wireless gateway using its wireless communication system. The wireless communication system is not an RFID communication system, according to some embodiments.

In some embodiments, multiple wireless RFID sniffing devices 1530A-1530C are all used to receive the RFID response signal 1522 and retrieve the RFID data encoded in the RFID response signal. The wireless RFID sniffing devices 1530A-1530C may collaborate by wireless communicating with each other using the respective wireless communication systems integrated in each of the wireless RFID sniffing devices 1530A-1530C. The wireless RFID sniffing devices 1530A-1530C may communicate the detected RFID signals received at their respective RFID antenna to each other to reconstruct the original signal generated by the passive RFID tag 1520. This may be used to overcome signal attenuation, low receiver sensitivity, interference, or noise that hinders the ability for an RFID reader to successfully receive the RFID response signal 1522. In some embodiments, one or more wireless nodes of the tracking system, which may include one of the wireless RFID sniffing devices 1530 or the RFID power delivery module 1510, instructs the one or more of the wireless RFID sniffing devices 1530A-1530C to activate an integrated RFID reader and attempt to receive an RFID response signal 1522.

By using the wireless RFID sniffing devices 1530, the hybrid RFID reader system 1501 is able to increase the density of wireless nodes that can detect the passive RFID tag's RFID response signal 1522, in comparison to a traditional RFID reader with the same cost of installation. In certain environments, it may be easier or more cost-effective to install wireless RFID sniffing devices than to install traditional RFID readers that require wiring and infrastructure resources. In some embodiments, a wireless RFID sniffing device communicates RFID data retrieved from RFID tags to a gateway device, gateway tape node, client device, or other wireless nodes of the tracking system 400 through Bluetooth, LoRa, WiFi, or some other wireless communication system integrated with the wireless RFID sniffing device. In some embodiments, the wireless RFID sniffing device uses long range wireless communication to transmit the RFID data over a wide area network connection or the internet to another wireless node of the tracking system 400. Separating the power-on module from the RFID tape node allows for minimal power consumption by the RFID tape nodes (since providing the power on signal consumes a lot of energy)

Figure 16:
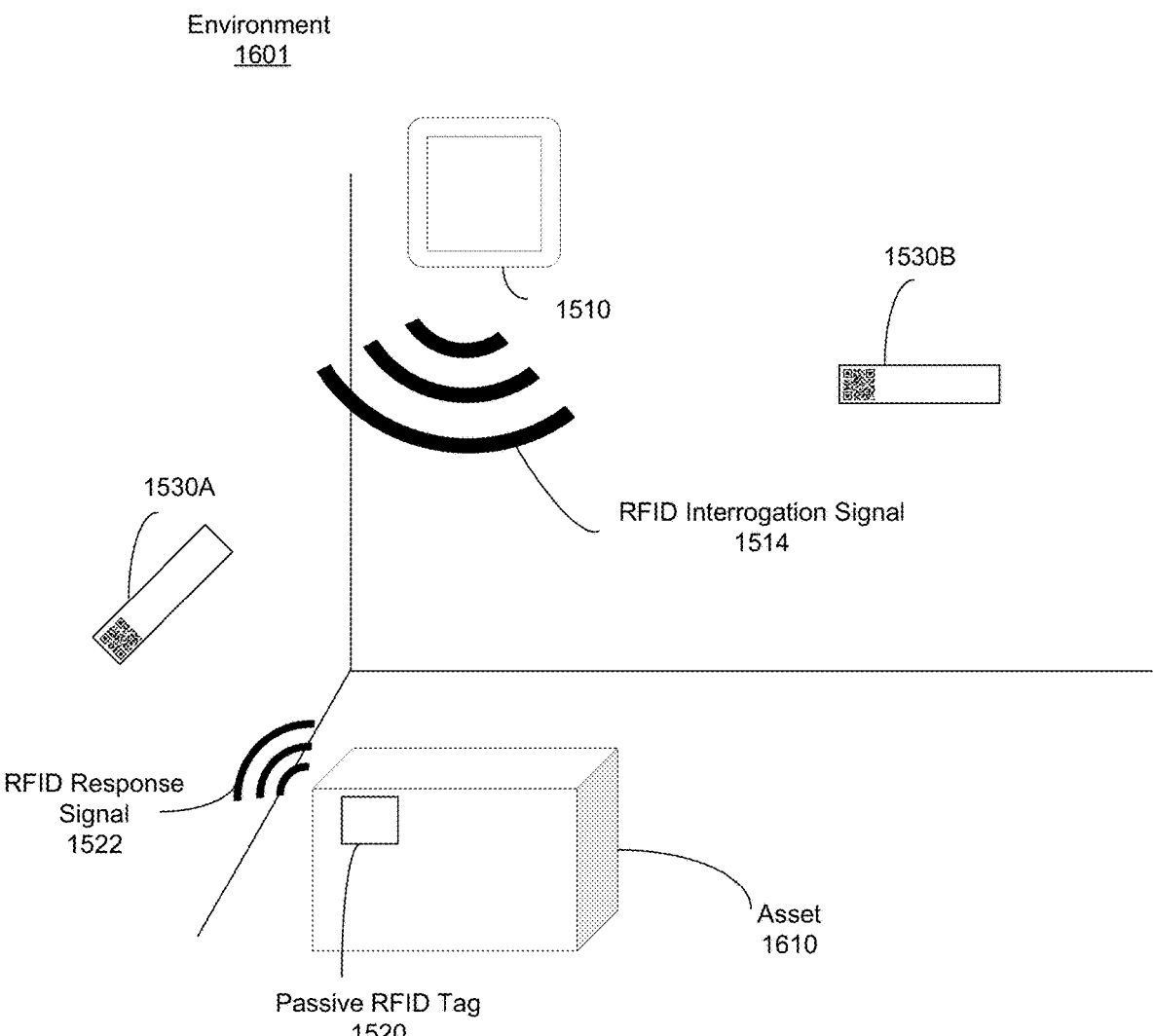
FIG. 16 shows an example environment of the improved RFID system of FIG. 15, according to some embodiments.

FIG. 16 shows an example environment 1601 of the hybrid RFID system 1501 of FIG. 15, according to some embodiments. In the example of FIG. 16, the environment 1601 is a room that includes the RFID power-on module 1510 located in a first location in the room and two wireless RFID sniffing devices 1530A and 1530B attached to a wall of the room in a second and third location, respectively. In this example, the location of an asset 1610 is determined based on detection of a passive RFID tag 1520 attached to the asset 1610 by the wireless RFID sniffing device 1530A. The RFID power-on module 1510 emits the RFID interrogation signal 1514 into the environment 1601, which is received by the passive RFID tag 1520 and converted into electrical power by the passive RFID tag 1520 for powering the passive RFID tag 1520. The passive RFID tag 1520 generates an RFID response signal 1522 with RFID data encoded into the RFID response signal based on data stored on a memory of the passive RFID tag 1520, in response to being powered on and receiving the RFID interrogation signal 1514.

The wireless RFID sniffing tape 1530A receives a superposition of the RFID interrogation signal 1514 and the RFID response signal 1522 and determines the RFID response signal 1522. The wireless RFID sniffing device decodes the RFID data encoded into the RFID response signal 1522 and combines it with data stored on the wireless RFID sniffing device 1530A. The combined RFID data may include identifiers for the passive RFID tag 1520, identifiers for the wireless RFID sniffing device 1530A, a time associated with the scanning of the passive RFID tag 1520, data on the asset 1610, other data, location data for the wireless RFID sniffing device 1530A or some combination thereof. In further embodiments, the wireless RFID sniffing device 1530A includes a GPS communication system and may determine its own location using GPS. The wireless RFID sniffing device may combine the RFID data from the passive RFID tag 1520 with GPS location data, according to some embodiments.

The wireless RFID sniffing device 1530A may store the RFID data or combined RFID data on a memory of the wireless RFID sniffing device 1530A and/or may wirelessly communicate the combined RFID data to a wireless node of the tracking system 400, such as a gateway. In some embodiments, the wireless RFID sniffing device 1530A communicates the combined RFID data to a server of the tracking system 400 or the cloud using a long range wireless communication system, such as a cellular or a satellite communication system. In some embodiments, the RFID power-on module 1510 also functions as a gateway device of the tracking system 400 and receives the combined RFID data from the wireless RFID sniffing device 1530A over a wireless communication connection. The gateway may then communicate the combined RFID data to the tracking system 400, such as to a server or control system 1210. The combined RFID data may include data on which RFID sniffing device 1530A detected the passive RFID tag 1520 and received the RFID response signal 1522, according to some embodiments. The tracking system 400 may determine that the asset 1610 is located in proximity to the wireless RFID sniffing device 1530A based at least on the combined RFID data received from the gateway or the wireless RFID sniffing tape 1530A.

The location of an RFID tag is determined to be in proximity of the location of the wireless RFID sniffing device that detects the presence of the RFID tag. The wireless RFID sniffing device may reports its own location to the tracking system, either at the time of scanning the RFID tag or at a different time. For example, each of the wireless RFID sniffing device may report its own location to the tracking system 400 or to another wireless node of the tracking system 400 during an initialization step of the wireless RFID sniffing device. In some embodiments, the wireless RFID sniffing device or another wireless node may continuously report or periodically report the location of the wireless RFID sniffing device, based on communication between the wireless RFID sniffing device and other wireless nodes of the tracking system 400, such as gateways devices, gateway tape nodes, client devices, tape nodes, other wireless RFID sniffing devices, or some combination thereof.

Figure 17A:
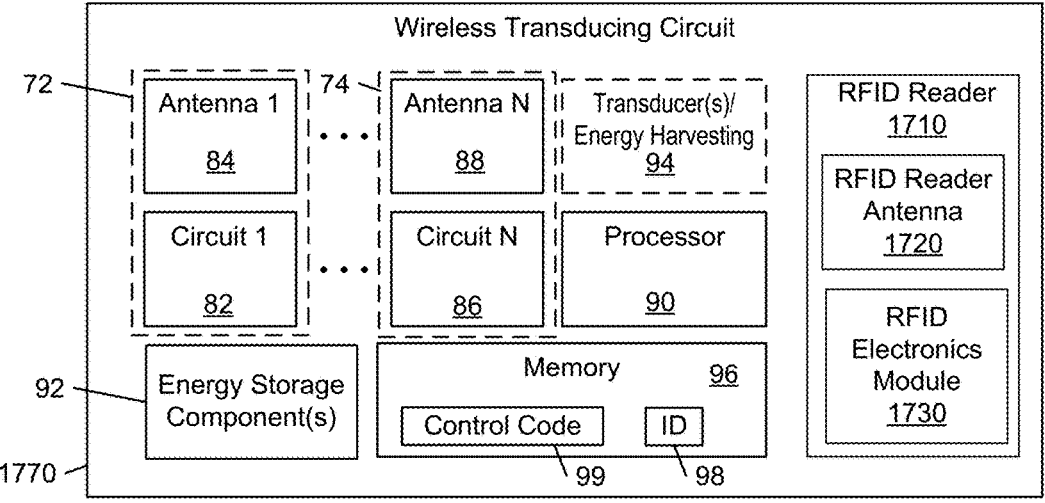
FIGS. 17A-17B are example diagrams for a wireless RFID sniffing device, according to some embodiments.
Figure 17B:
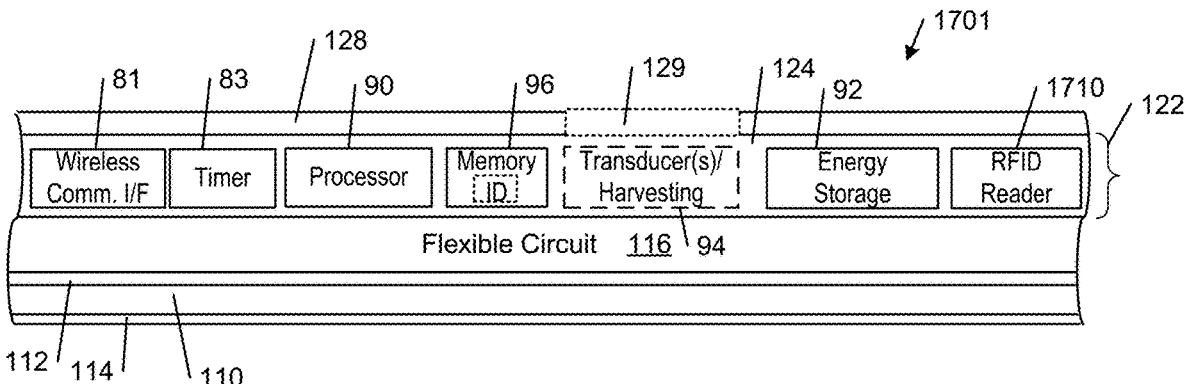

FIG. 17A-17B are example diagrams for a wireless RFID sniffing device 1701, according to some embodiments. The wireless RFID sniffing device 1701 may also be referred to herein as an "RFID reader tape" 1701 or an "RFID tape node" 1701. The wireless RFID sniffing device 1701 is an embodiment of the adhesive tape platform shown in FIGS. 1A-5C that includes an RFID reader 1710 integrated into the adhesive tape platform. The RFID reader 1710 includes an RFID reader antenna 1720 and an RFID electronics module 1730 for operating the RFID reader antenna 1720 and interpreting RFID data signals received from RFID tags at the RFID reader antenna 1720. The RFID tape node 1701 may be a flexible device that is configured to be attached or adhered to an asset or surface of an object.

FIG. 18 is flowchart for a method 1801 of communicating with RFID tags using a hybrid RFID reader system to determine the location of the RFID tags, according to some embodiments. The method includes transmitting 1810 an RFID interrogation signal from an RFID power delivery module into an environment where wireless RFID sniffing devices are located. An RFID tag in the environment receives 1820 the RFID interrogation signal and, in response, emits a response signal based on data stored on a memory or storage of the RFID tag. At least one wireless RFID sniffing device receives 1830 the response signal or superposition of the response signal and the RFID interrogation signal at an RFID antenna of the wireless RFID sniffing device. The wireless RFID sniffing device then retrieves 1840 RFID data from the response signal or the superposition of the response signal and the RFID interrogation signal. The wireless RFID sniffing device optionally stores 1850 the retrieved RFID data in a memory or storage of the wireless RFID sniffing device. The wireless RFID sniffing device then transmits the RFID data and/or other data to another wireless node of a tracking system 400. The other wireless node may be a gateway node or gateway device of the tracking system 400. The wireless RFID sniffing device may transmit the RFID data using a wireless communication system such as Bluetooth, Zigbee, LoRa, WiFi, or another wireless communication system. A tracking system 400 associated with the hybrid RFID system receives the RFID data from the other wireless node or from the wireless RFID sniffing data and determines 1870 the location of the RFID tag to correspond to the location of the wireless RFID sniffing device based on the received RFID data. The location of the RFID tag may be stored on a database of the tracking system or may be received by the tracking system 400 by a wireless node of the tracking system. The RFID data received by the tracking system 400 may be combined with other data from the wireless RFID sniffing device or the other wireless node, including, for example, the location of the wireless RFID sniffing device, in some embodiments.

Figure 19:
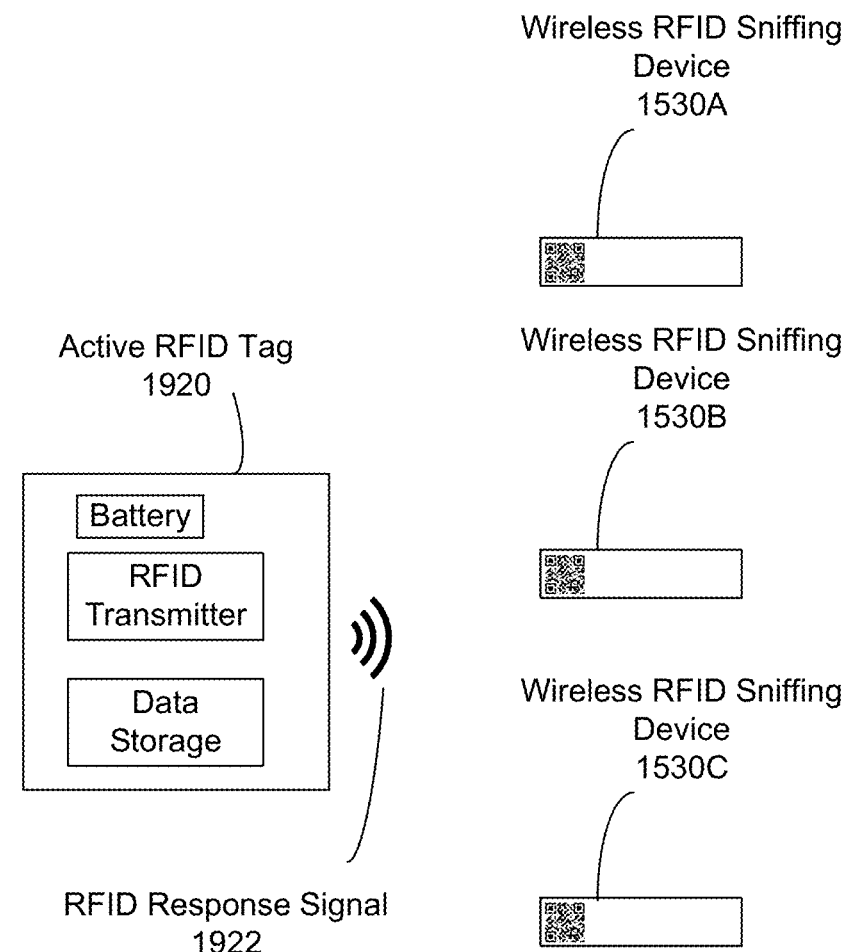
FIG. 19 is a diagram of an improved RFID system for locationing that includes active RFID tags and wireless RFID reading devices, according to some embodiments.

FIG. 19 is a schematic diagram of a hybrid RFID system 1901 for locationing that includes active RFID tags and wireless RFID reading devices, according to some embodiments. The hybrid RFID system 1901 is an embodiment of the hybrid RFID system 1501 shown in FIGS. 15 and 16, except active RFID tags 1920 are used instead of passive RFID tags 1520. The active RFID tags 1920 include a power source, such as a battery, and do not need to receive electrical power from an RFID interrogation signal 1514 to generate and emit the RFID response signal 1922. In some cases, an RFID power delivery moduel 1510 is not necessary or may not be installed in the environment of the wireless RFID sniffing devices 1530A-1530C. In this case, the wireless RFID sniffing devices 1530A-1530C are configured to receive the RFID response signal transmitted from active RFID tags 1920. The hybrid RFID sniffing device 1901 functions similarly to the hybrid RFID sniffing device 1501 discussed above and shown in FIGS. 15-18, with respect to communicating the RFID data encoded in the RFID response signal from the wireless RFID sniffing devices 1530A-1530C to the tracking system 400 using wireless communications.

Figures 20A, 20B:
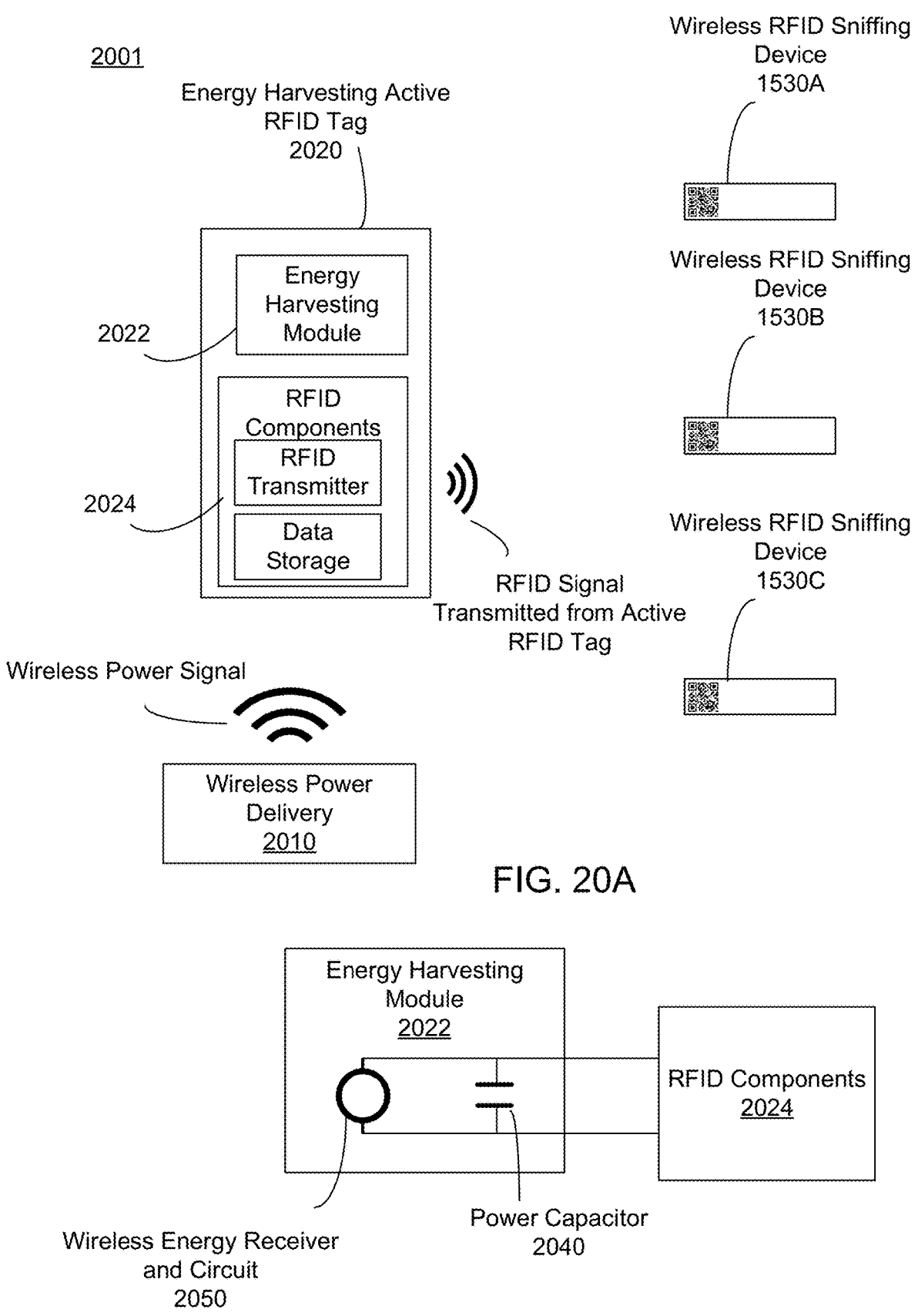
FIGS. 20A-20B is a diagram of an improved RFID system for locationing that includes energy harvesting active RFID tags and wireless RFID reading devices, according to some embodiments.

FIGS. 20A-20B is a diagram of a hybrid RFID system 2001 for locationing that includes energy harvesting active RFID tags and wireless RFID reading devices, according to some embodiments. The hybrid RFID system 2001 is an embodiment of the hybrid RFID system 1901 shown in FIG. 19, except that the active RFID tags 1920 are energy harvesting active RFID tags 2020 that use an energy harvesting module 2022 to harvest energy from electromagnetic waves in the environment to power the active RFID tag. In some embodiments, the energy harvesting module 2022 harvests electrical power from electromagnetic waves that are not associated with an RFID reader system. In other embodiments, the energy harvesting module harvests electrical power from electromagnetic waves that are associated with an RFID reader system.

The electromagnetic waves in the environment may be generated by a wireless power delivery device 2010 that emits a wireless power signal for powering energy harvesting electrical devices, according to some embodiments. The wireless power delivery device 2010 may be associated with the hybrid RFID reader system 2001 or the tracking system 400, but in other embodiments the wireless power delivery device 2010 may not be associated with either the hybrid RFID reader system 2001 or the tracking system 400. For example, the wireless power delivery device 2010 may be a device associated with another wireless or RF communication system, such as a client device, smart phone, or radio device.

The energy harvesting module includes a wireless energy receiver and circuit 2050 coupled to a power capacitor 2040 that stores harvested electrical energy for powering the RFID components 2024 of the active RFID tag. In further embodiments, the power capacitor 2040 may be a super capacitor.

Although FIGS. 15-16 and 19-20 show various numbers and configurations of components and devices, the embodiments of the hybrid RFID system are not limited to those shown in FIGS. 15-16 and 19-20. For example, a hybrid RFID system may include a different number of wireless RFID sniffing devices than shown in FIGS. 15-16 and 19-20. A hybrid RFID system may also include additional or different components than shown in FIGS. 15-16 and 19-20, according to some embodiments.

Computer Apparatus

Figure 21:
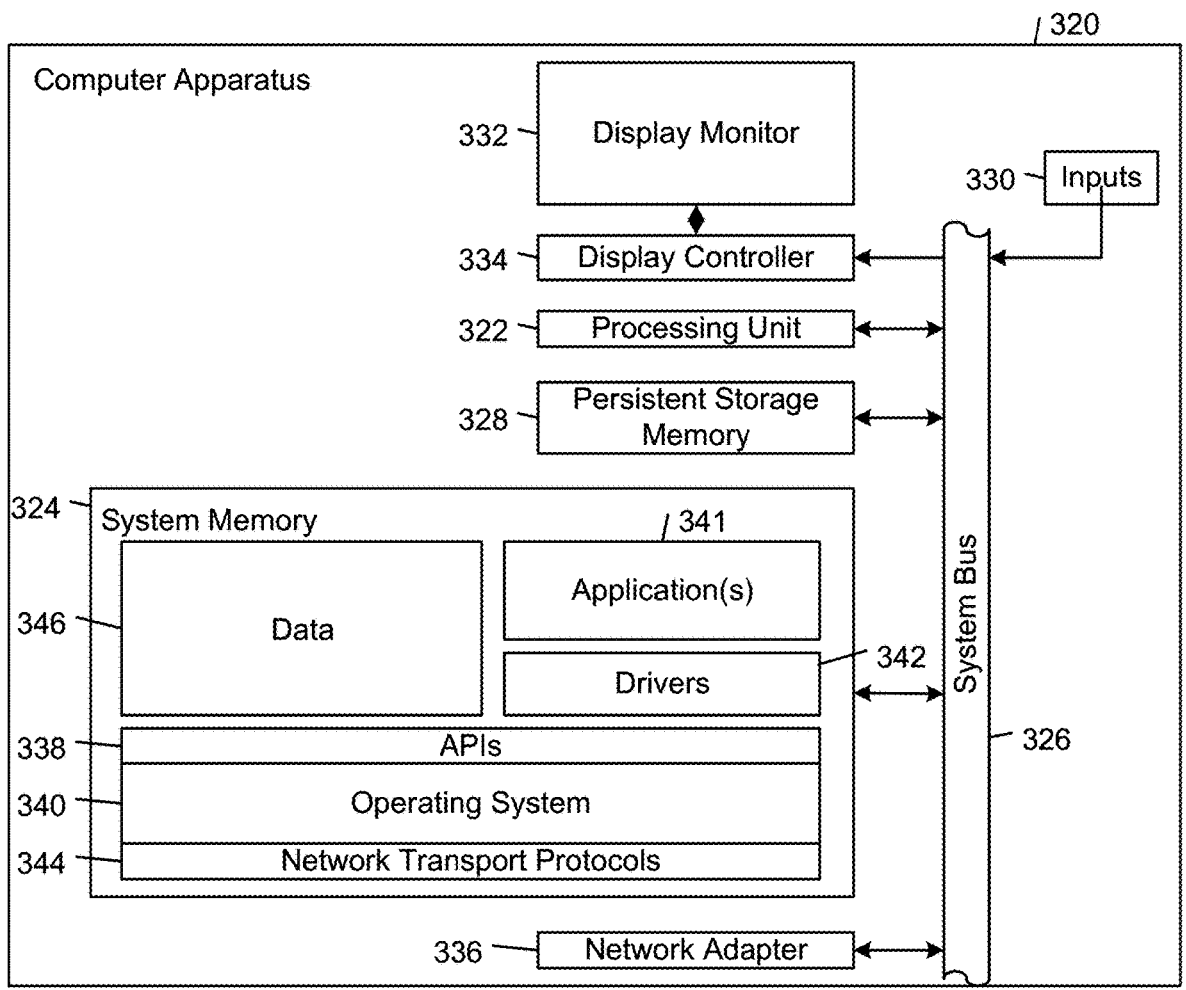
FIG. 21 shows an example embodiment of computer apparatus, according to some embodiments.

FIG. 21 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non- transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A radio frequency identification (RFID) reader system comprising:
a plurality of wireless integrated RFID readers located in different locations in an environment, each wireless integrated RFID reader comprising:
an RFID reader comprising an RFID antenna coupled to an electronics module, the electronics module configured to operate the RFID antenna, receive an interrogation signal from a RFID power delivery device, and interpret data signals received at the RFID antenna from one or more RFID tags, and
a wireless communication system of a first type configured to wirelessly communicate with at least one other of the plurality of integrated RFID readers to reconstruct an original response signal generated by the RFID tag;
the one or more RFID tags, each RFID tag configured to generate a radio frequency (RF) response signal based on data stored on the RFID tag.

2. The RFID reader system of claim 1, further comprising:
a wireless communication gateway comprising:
a wireless communication system of a second type; and
a wireless communication system of a third type configured to communicate with a server,
wherein, at least one of the plurality of wireless integrated RFID readers further comprises a wireless communication system of the second type for communicating with the wireless communication gateway,
and data from the one or more RFID tags is transmitted from the at least one of the plurality of wireless integrated RFID readers to the wireless communication gateway using the wireless communication system of the second type.

3. The RFID reader system of claim 1 at least one of the plurality of wireless integrated RFID readers configured to wirelessly communicate with a server; wherein the server executes a control system configured to collect, store, and analyze data and communications associated with the plurality of wireless integrated RFID readers.

4. The RFID reader system of claim 3, wherein the wireless communication with the server occurs using one or more of a cellular communication system, wireless broadband communication system, a 4G communication system, an LTE communication system, a 5G communication system, and a satellite communication system.

5. The RFID reader system of claim 3, wherein the control system is associated with an asset tracking system for tracking assets that are associated with the one or more RFID tags.

6. The RFID reader system of claim 5, wherein the location of an asset associated with one of the one or more RFID tags is determined based on RFID communications that occur between one of the plurality of wireless integrated RFID readers and the one RFID tag.

7. The RFID reader system of claim 1, at least one of the wireless integrated RFID readers further comprises a battery for providing electrical power to the electronics module and the wireless communication system.

8. The RFID reader system of claim 1, wherein at least of the wireless integrated RFID readers receives electrical power from a power supply connected to an electrical power line or electrical power outlet.

9. The RFID reader system of claim 1, wherein at least one of the wireless integrated RFID readers further comprises a wireless communication system of a third type configured to wirelessly connect to a wide area network or wirelessly connect to internet.

10. The RFID reader system of claim 9, wherein the at least one of the wireless integrated RFID readers transmits data received from RFID tags to a control system via a network connection using the wireless communication system of the third type.

* * * * *